US010574419B2

(12) United States Patent
Chatterjee et al.

(10) Patent No.: US 10,574,419 B2
(45) Date of Patent: Feb. 25, 2020

(54) CONFIGURATION OF NON-UE-SPECIFIC SEARCH SPACE FOR M-PDCCH

(71) Applicant: Intel IP Corporation, Santa Clara, CA (US)

(72) Inventors: Debdeep Chatterjee, Mountain View, CA (US); Marta Martinez Tarradell, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 15/743,589

(22) PCT Filed: Dec. 23, 2015

(86) PCT No.: PCT/US2015/000284
§ 371 (c)(1),
(2) Date: Jan. 10, 2018

(87) PCT Pub. No.: WO2017/026971
PCT Pub. Date: Feb. 16, 2017

(65) Prior Publication Data
US 2018/0212736 A1    Jul. 26, 2018

Related U.S. Application Data

(60) Provisional application No. 62/204,313, filed on Aug. 12, 2015, provisional application No. 62/232,386, filed on Sep. 24, 2015.

(51) Int. Cl.
*H04L 5/00* (2006.01)
*H04W 4/70* (2018.01)
(Continued)

(52) U.S. Cl.
CPC .......... *H04L 5/0053* (2013.01); *H04L 5/0048* (2013.01); *H04L 5/0094* (2013.01);
(Continued)

(58) Field of Classification Search
CPC . H04W 72/042; H04W 4/70; H04W 72/0446; H04L 5/0053; H04L 5/0007
See application file for complete search history.

(56) References Cited

U.S. PATENT DOCUMENTS

2013/0194956 A1    8/2013  Sartori et al.
2017/0013391 A1*   1/2017  Rico Alvarino ........ H04W 4/70
(Continued)

FOREIGN PATENT DOCUMENTS

EP          2369883 A1    9/2011
WO     2014/069946 A1    5/2014

OTHER PUBLICATIONS

International Search Report and Written Opinion dated Apr. 22, 2016 from International Application No. PCT/US2015/000284, 17 pages.

(Continued)

Primary Examiner — Jung H Park
(74) Attorney, Agent, or Firm — Fish & Richardson P.C.

(57) ABSTRACT

This disclosure relates to implementations to support non-UE-specific (i.e. common) and UE-specific search spaces (SS) for M-PDCCH. One implementation relates to a UE comprising RF circuitry to receive, from an eNB, configuration information of one or a plurality of common Search Spaces (CSSs) for M-PDCCH; and baseband circuitry to monitor the one or more configured CSS for M-PDCCH transmissions; wherein the RF circuitry and/or baseband circuitry is adapted to support a reduced bandwidth (BW). Another implementation relates to an eNB comprising RF circuitry to transmit configuration information of a plurality of CSSs for M-PDCCH to one or more UEs supporting a reduced BW, wherein the plurality of CSSs for M-PDCCH are differentiated by "based on functionality"-differentiation that includes the type of use case and/or an EC level of the UE.

22 Claims, 6 Drawing Sheets

(51) Int. Cl.
*H04W 48/12* (2009.01)
*H04W 68/02* (2009.01)

(52) U.S. Cl.
CPC ............ *H04W 4/70* (2018.02); *H04W 48/12* (2013.01); *H04W 68/02* (2013.01)

(56) References Cited

U.S. PATENT DOCUMENTS

2018/0110045 A1* 4/2018 You .......................... H04J 11/00
2018/0115943 A1* 4/2018 Park ....................... H04W 68/00
2018/0192354 A1* 7/2018 Yi .......................... H04W 48/16
2018/0332566 A1* 11/2018 You ........................... H04L 5/00

OTHER PUBLICATIONS

LG Electronics, "Discussion on Resource configuration for low complexity MTC UEs," 3GPP TSG RAN WG1 Meeting #81, R1-152696, Agenda Item: 6.2.1.1, May 25-29, 2015, Fukuoka, Japan, 6 pages.
LG Electronics, "Configurations for M-PDCCH search space," 3GPP TSG RAN WG1 Meeting #81, R1-152699, Agenda Item: 6.2.1.2, May 25-29, 2015, Fukuoka, Japan, 6 pages.

* cited by examiner

CONFIGURATION OF NON-UE-SPECIFIC SEARCH SPACE FOR M-PDCCH

RELATED APPLICATIONS

The present application is a national phase entry under 35 U.S.C. § 371 of International Application No. PCT/US2015/000284, filed Dec. 23, 2015, entitled "CONFIGURATION OF NON-UE-SPECIFIC SEARCH SPACE FOR M-PDCCH", which designates the United States of America, which claims the benefit of priority under 35 U.S.C. § 119(e) of U.S. Provisional Application Ser. No. U.S. 62/204,313, filed Aug. 12, 2015, entitled "SYSTEM AND METHODS FOR CONFIGURATION OF NON-UE-SPECIFIC SEARCH SPACE FOR M-PDCCH", and of Provisional Application Ser. No. U.S. 62/232,386, filed Sep. 24, 2015, entitled "CONFIGURATION OF NON-UE-SPECIFIC SEARCH SPACE FOR M-PDCCH". The entire specifications of which are hereby incorporated by reference in their entireties for all purposes, except for those sections, if any, that are inconsistent with this specification.

FIELD

Implementations of this disclosure generally relate to the field of Machine-Type Communication (MTC) involving user equipments (UEs) and evolved Node Bs (eNBs). More specifically, implementations of this disclosure support non-UE-specific and UE-specific search spaces (SS) for M-PDCCH (Physical Downlink Control Channel for MTC).

BACKGROUND

Machine-Type Communication (MTC) is a promising and emerging technology to enable a ubiquitous computing environment towards the concept of "Internet of Things (IoT)". Potential MTC based applications include smart metering, healthcare monitoring, remote security surveillance, intelligent transportation system, etc. These services and applications stimulate the design and development of a new type of MTC device that needs to be seamlessly integrated into legacy, current, and next generation mobile broadband networks such as LTE and LTE-Advanced.

BRIEF DESCRIPTION OF THE DRAWINGS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention.

However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

DETAILED DESCRIPTION

Figure 1:
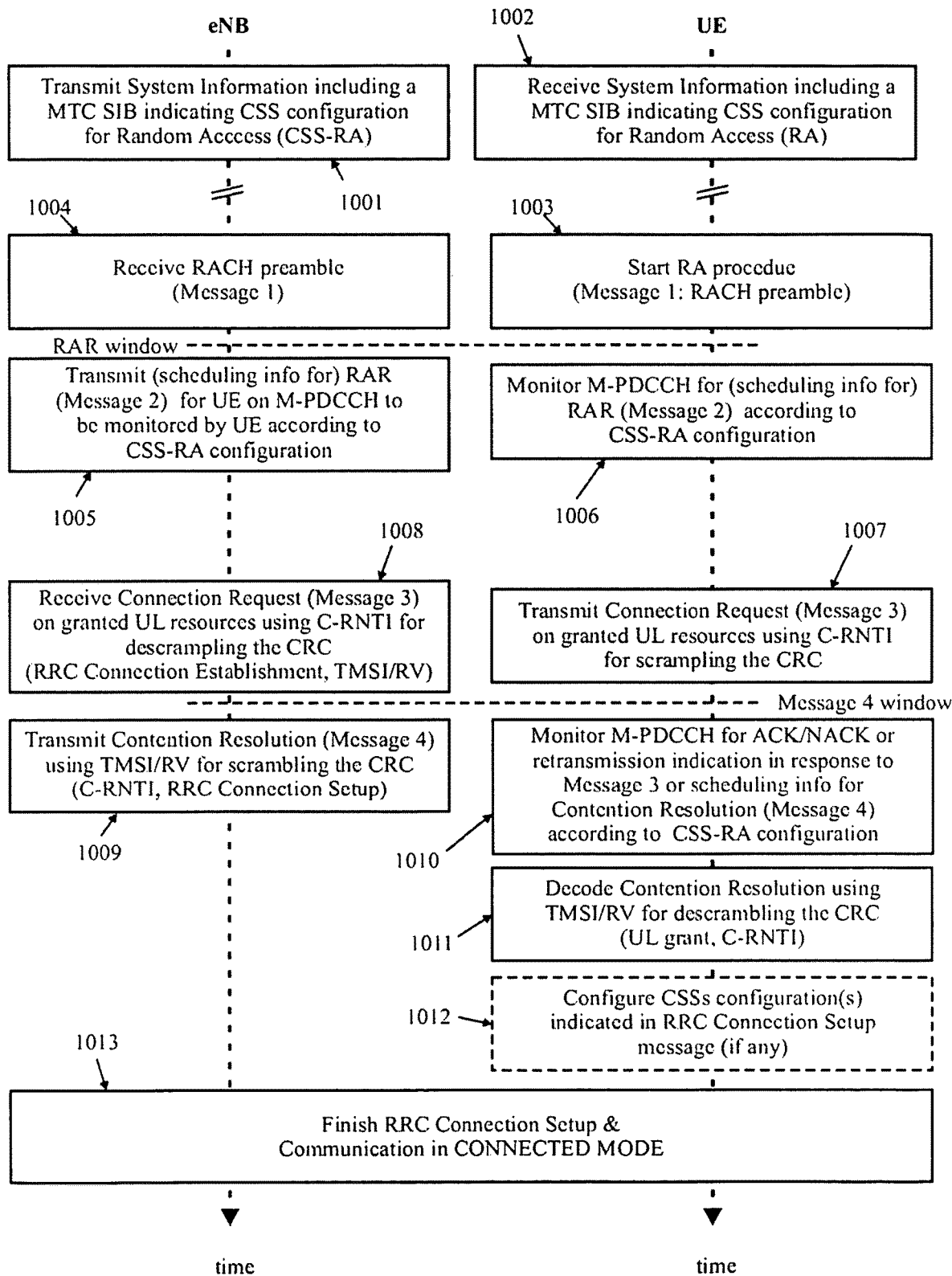
FIG. 1 shows operations of a Random Access (RA) procedure between a UE and a eNB using a CSS for RA-related messages according to one exemplary implementation of this disclosure.

The legacy mobile broadband networks were designed to optimize performance mainly for human type of communications and thus are not designed or optimized to meet the MTC related requirements. MTC specific design are being studied by 3GPP Radio Access Network (RAN) working groups (WGs) for specification support in Release 12 LTE specifications, wherein the primary objective is to focus on the lower device cost, enhanced coverage and reduced power consumption.

To further reduce the cost and power consumption, it may be beneficial to further reduce the transmission bandwidth for MTC system to 1.4 MHz which is the minimum bandwidth of legacy LTE system. In this case, the transmission bandwidth for both control and data channels can be reduced to 1.4 MHz (although the system bandwidth may be larger, e.g. 3 MHz, 5 MHz, 10 MHz, 15 MHz, 20 MHz or even higher). In general, it is envisioned that a large number of MTC devices will be deployed for specific services within one cell in the near future. When such a massive number of MTC devices attempt to access and communicate with the network, multiple MTC regions with 1.4 MHz bandwidth can be allocated by eNB.

At the RAN1 #80 meeting, it was agreed that Release 11 evolved Physical Downlink Control Channel (E-PDCCH) would be used as the starting point for the design of the M-PDCCH for Release 13 Low Complexity (LC) MTC UEs. However, Release 11 E-PDCCH design only supports a UE-specific search space that is configured using dedicated Radio Resource Control (RRC) signaling (which in turn is scheduled using legacy Physical Downlink Control Channel (PDCCH)).

For Release 13 LC MTC UEs, support of non-UE-specific or "common" search space for certain functionalities may be desirable. Such common search space (CSS) for M-PDCCH may for example include (but not limited to):

scheduling information for one or more of paging messages, Random Access Response (RAR) messages, Contention Resolution Message (Message 4 of Random Access (RA) procedure) and PDSCH carrying dedicated RRC signaling for configuration of UE-specific Search Space (SS) for E-PDCCH;

transmission of Dedicated Control Information (DCI) for group power control (using TPC-PUSCH-RNTI or TPC-PUCCH-RNTI);

transmission of DCI for group HARQ-ACK in response to Physical Uplink Channel (PUSCH) transmissions.

At the RAN1 #81 meeting, it was agreed as working assumptions that for Release 13 LC MTC UEs and UEs in enhanced coverage (EC), paging messages should be carried by PDSCH scheduled by M-PDCCH and RAR messages will be carried by M-PDCCH for the case of a single MAC RAR in a narrowband (NB) and will be carried be PDSCH scheduled by M-PDCCH for the case of multiple MAC RARs in a NB.

Some aspects of this disclosure may support non-UE-specific and UE-specific SSs for M-PDCCH. This maybe for example realized by using different M-PDCCH-PRB sets (referred to as "E-PDCCH-PRB sets" in this disclosure) for the different SSs. Additionally, in some exemplary implementations discussed herein below, there is an option to transmit the a M-PDCCH UE-specific SS configuration as part of the Contention Resolution message (Message 4) of the Random Access (RA) procedure, that is scheduled using M-PDCCH in a non-UE-specific SS. The UE may monitor this non-UE-specific SS only while the Contention Resolution Timer of the RA procedure is running.

Further details of the design and configuration of non-UE-specific M-PDCCH SS with—an exemplary—focus on details of scheduling of RAR and paging messages will be discussed herein below. Generally, it is also noted that a "non-UE specific search space" (nUE-SS) may also be referred to as a "common search space" (CSS). Accordingly, a non-UE specific search space for M-PDCCH can also be referred to as a common search space for M-PDCCH.

It should be further noted that the different implementations of this disclosure may be readily applied for configuration of one or more non-UE-specific SSs for Release 13 LC MTC UEs and Release 13 MTC UEs in enhanced coverage (EC).

Configuration of Non-UE-Specific Search Space (nUE-SS) for M-PDCCH

One aspect of this disclosure related to the design of M-PDCCH search space—referred to as non-UE-specific SS (m-UE SS) or Common SS (CSS) for M-PDCCH UE-specific SS for M-PDCCH" in every DL subframe (which is different from the concept of Common Search Space (CSS) for PDCCH defined in legacy LTE).

Further, the CSS for M-PDCCH may not be common to all the UEs in the cell but only certain groups of UEs may monitor a certain instance of the CSS for M-PDCCH at a time. For example, the CSS for M-PDCCH could be monitored by all or a group of UEs in the cell "based on functionality" differentiations (also referred to as based-on-functionality-differentiations) that may include the type of use case (message to be transmitted or scheduled), EC level of the UE, etc. Therefore, it is possible that one or multiple "CSS for M-PDCCH" regions are defined from the network perspective.

Alternatively, a common configuration of a CSS for M-PDCCH can be provided and different sets of UEs may be implicitly indicated to monitor different physical resources (e.g., NBs) for monitoring of M-PDCCH transmissions in their respective CSS for M-PDCCH. This common configuration may thus not need to include any NB index of a NB where the UE is intended to monitor for M-PDCCH transmissions.

For scheduling of RAR (Message 2), paging and Message 4, the CSS for M-PDCCH may be configured "based on functionality" instead of being monitored in every DL subframe as defined for legacy PDCCH Common Search Space (CSS) in LTE. In general, "based on functionality" indicates that the network (e.g. eNB) configures the usage of the CSS region depending on the different functionality factors and/or depending on the different kind of messages that are being scheduled or transmitted (such as RAR vs. paging vs. Message 4). These factors may for example include one or more of the following: the EC coverage level required by the UE, the number of repetitions (Repetition Level (RL)) required by the UE, the type of UE, the type of establishment cause for the RRC Connection request (transmitted via Message 3 transmission), the type of paging, etc.

For example, each instance of plural CSSs (i.e. nUE-SSs) could be differentiated based on the type of message scheduling or transmissions as:

CSS for RAR (CSS-RAR),
CSS for paging (CSS-Paging), and
CSS for Message 4 (CSS-Msg4) scheduling.

Alternatively to providing different CSS for different types of scheduling or transmissions, a single CSS configuration may be provided for a UE for monitoring. For example, the UEs may monitor the single CSS for different DCIs scrambling by different Radio Network Temporary Identifiers (RNTIs) at different time instances. For example, during or before paging occasions (POs), a UE may monitor the single CSS for DCI scheduling a transmission of paging messages on the PDSCH and with the CRC scrambled with a P-RNTI. The same CSS can be monitored for DCI with CRC scrambled with an RA-RNTI that either carries the RAR message itself or a scheduling assignment of a transmission on the PDSCH carrying the RAR message. Similarly, for the case of monitoring for DCI scheduling transmission of Message 4 during the period of the Contention Resolution Timer, the UE may also try to descramble the CRC with the RA-RNTI.

This alternative of a single CSS may also be extended to multiple separate physical resources from the network perspective. For example, multiple NBs can be configured for a CSS and different NBs could be monitored by different UEs based on their UE ID or EC level or Physical Random Access Channel (PRACH) transmission parameters, etc. This may for example allow minimizing the user blocking probability in the cell, for paging, RAR or Message 4 transmissions.

The configuration information of a CSS can be provided as a single configuration, optionally along with the indices of one or more NBs associated with the CSS. These NBs may be defined in the logical domain so as to possibly incorporate frequency hopping between different 1.4 MHz NBs within the system bandwidth (for example, plural NBs may be provided adjacent to each other within the frequency domain of the overall system bandwidth). Further, a mapping can be defined to map the EC level, UE ID, etc. of the UEs to logical indices (ranging from 0 through numNB$_{total}$) of the instances of the CSS in the frequency dimension (i.e. on the different NBs), where numNB$_{total}$ is the total number of NBs defined. Thus, the configuration information, except for the NB location may be identical for all instances of a CSS mapped to different NBs. Note that a similar idea can also be applied to configure the multiple instances of each of a CSS for RAR messages, a CSS for paging or a CSS for Message 4, if these SSs are configured separately.

For the use of CSS for purposes other than transmission of RAR, paging or Message 4 (i.e., for group TPC, group HARQ-ACK feedback, etc.), the same CSS can be monitored but potentially with different configuration information, such as, starting subframe for M-PDCCH, and a periodicity. This (additional) configuration information can be indicated by configuring a period, duration and offset (e.g. with respect to the System Frame Number (SFN)) that are provided to the UE via dedicated RRC signaling, via LC/EC/MTC/CIoT SIB signaling or a multicast-kind of signaling. For the option of dedicated RRC signaling, this information can be provided to the UE as part of the configuration of UE-specific SS, e.g. through new or extended fields/information elements (IEs) within Message 4 or a RRC Connection Reconfiguration message.

If separate CSSs are configured for RAR, paging, Message 4 transmissions, it may also be advantageous to configure a CSS can be configured for other purposes, which is also referred to as "CSS-ConnectedMisc" herein. This CSS-ConnectedMisc may be for example monitored by UEs in RRC CONNECTED mode. For example assuming a NB with 1.4 MHz, there are two candidate M-PDCCH-PRB sets. One of the two M-PDCCH-PRB sets can be configured as part of UE-specific search space configuration for E-PDCCH according to the legacy LTE specifications. Generally, a CSS for M-PDCCH may be mapped to a different M-PDCCH PRB set than a UE-specific SS. This may imply that a CSS for M-PDCCH may be mapped to a different NB within the system bandwidth than a UE-specific SS. Furthermore, if there multiple instances of CSSs, the different CSSs may be also mapped to different M-PDCCH PRB sets, which may or may not be in different NBs.

Compared to the option of defining separate CSSs for RAR, paging, Message 4 and other purposes, the main benefit of configuring a single CSS for a UE to monitor for reception of these different messages/control information, may be reduced signaling overhead. On the other hand, separate configuration of multiple CSSs can benefit from (i) a reduction in the required UE processing complexity by reducing the number of DCI formats a UE may need to attempt to blindly decode in each subframe, and (ii) additional scheduling flexibility and optimized configuration of the different CSS (in terms of Aggregation Level (AL), Repetition Level (RL), M-PDCCH-PRB set, etc.) depending on the use case.

In general, it may be possible to have a combination of both options wherein not all CSSs are separately configured depending on functionality, and instead, some of the use cases are combined to be addressed with a single CSS that the UE may monitor at different times and with different RNTI for different purposes. In one exemplary implementation of combining several used cases in one CSS, a common CSS configuration can be signaled for UEs to monitor for M-PDCCH transmissions: (i) for scheduling of RAR messages, (ii) for carrying the HARQ-ACK feedback in response to Message 3 transmissions on the UL, (iii) for Message 4 scheduling, and (iv) (optionally) for the scheduling of the PDSCH with the RRC Connection setup message if the RRC Connection setup message is not carried along with the Message 4 transmission. Since these four transmissions on the DL constitute an expected sequence of DL transmissions to a UE during the RA procedure and RRC connection establishment, it can be possible to have a single common configuration of the CSS that the UE can monitor for detection of the M-PDCCH transmissions related to the RA procedure and RRC connection establishment messages.

In this case, the time resources (subframes) for monitoring for the M-PDCCH candidates in the common CSS and the frequency location for the common CSS may be determined as those for CSS-RAR.

In another exemplary implementation of combining several used cases in one CSS, the CSS configuration could be common for only use cases (ii), (iii), and (iv), with the UE monitoring a common set of resources and common (or different, see below) set of (AL, RL) pairs for monitoring of one or more DCI sizes corresponding to use cases (ii) through (iv).

The set of RLs and ALs to monitor for this CSS can be a common set for all these purposes; alternatively, pre-defined rules can be specified to define the relationship between the possible set of (AL, RL) pair to be monitored for detection of each of the M-PDCCH transmissions. As a specific example, the (AL, RL) pair can be common for use cases (i), (iii), (iv), while for use case (ii) (i.e., transmission of HARQ-ACK in response to Message 3 transmission), the set of (AL, RL) could be a subset of the common set with possibly lower AL and/or RL values used for transmission of the HARQ-ACK feedback. Such exemplary design may be suitable in connection with a novel and very compact DCI format for carrying the HARQ-ACK feedback information. For example, HARQ-ACK feedback in response to Message 3 transmission may indicate both ACKnowledgment (ACK) or Negative ACKnowledgment (NACK). Alternatively, HARQ-ACK feedback in response to Message 3 transmission may only a NACK, while an ACK is implicitly indicated by the DCI carrying scheduling information for the transmission of Message 4.

For the exemplary implementations of combining several used cases in a single CSS, the starting subframe for the CSS wherein the UE monitors for each of the different M-PDCCH transmissions and the DCI formats including a scrambled CRC, the RNTIs for scrambling the CRC may be different for the different use cases. Specifically, a UE may monitor the same frequency resources (e.g. indicated via an M-PDCCH PRB set) within the CSS for different DCIS scrambled with different RNTIs at different instances of time. For example, the UE could be:

(1) monitoring the CSS for M-PDCCH for DCI having a CRC scrambled with RA-RNTI sent during the RAR window (e.g. with starting subframe of the CSS for M-PDCCH scheduling RAR being same as the first subframe of the RAR window).

(2) monitoring the CSS for M-PDCCH for DCI having a CRC scrambled with C-RNTI or Temporary C-RNTI carrying HARQ-ACK feedback in response to Message 3 transmission during the Contention Resolution Timer period or until the M-PDCCH with DL assignment for Message 4 is detected (e.g. with starting subframe of the M-PDCCH search space carrying HARQ-ACK feedback being same as the first subframe at the beginning of the Contention Resolution Timer period, i.e., once Contention Resolution Timer and T300 timers are activated);

(3) monitoring the CSS for M-PDCCH for DCI having a CRC scrambled with C-RNTI or Temporary C-RNTI carrying DL assignment for Message 4 scheduling during the ContentionResolutionTimer period (e.g. with the starting subframe of the M-PDCCH search space carrying HARQ-ACK feedback being same as the first subframe at the beginning of the Contention Resolution Timer period, i.e., once Contention Resolution Timer and T300 timers are activated);

(4) monitoring the CSS for M-PDCCH for DCI having a CRC scrambled with C-RNTI carrying DL assignment for the RRC Connection Setup message (e.g. when the RRC Connection Setup message is not carried as part of the Message 4 transmission but instead transmitted as a separate RRC message on PDSCH) from the first DL subframe after the transmission or at least the scheduling (i.e. M-PDCCH transmission) of the Message 4 transmission. For this case of an RRC Connection Setup message transmission separate from the Message 4 transmission, the initial UE-specific SS configuration may be carried as part of the RRC Connection Setup message instead of the Message 4 transmission itself.

Figure 3:
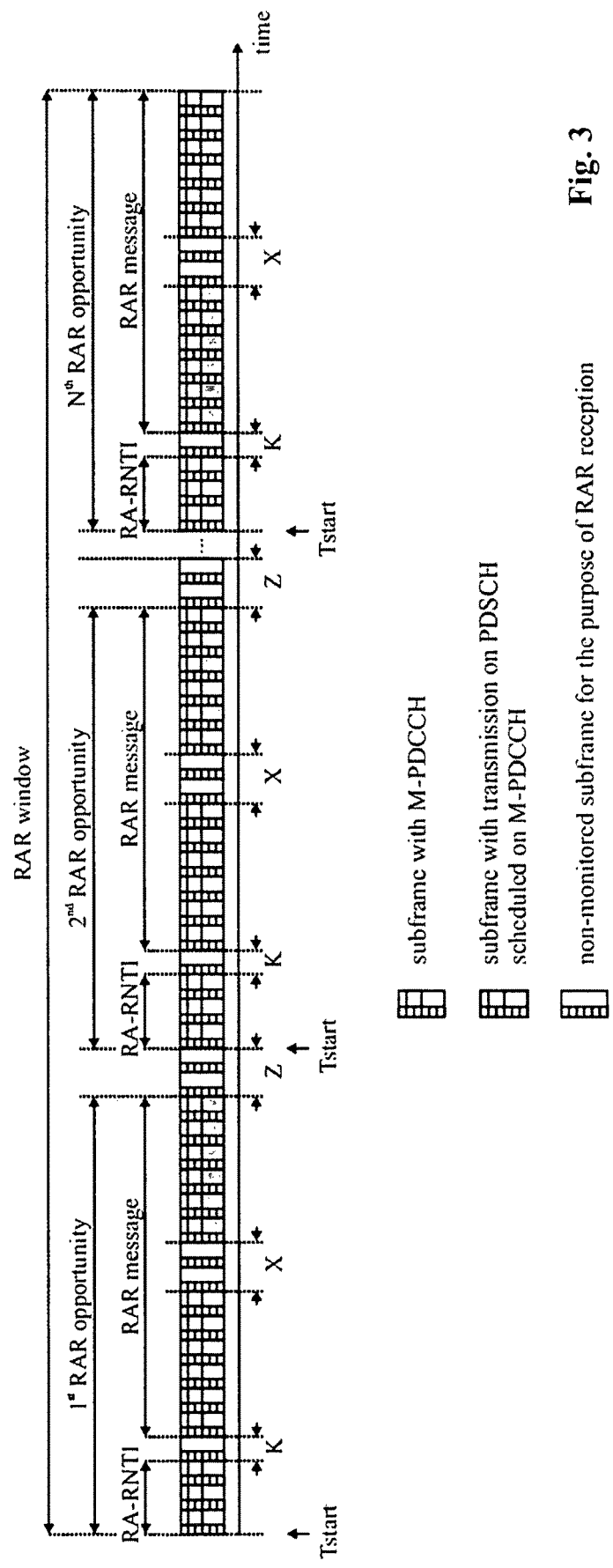
FIG. 3 shows an exemplary sequence of subframes in a RAR window within a 1.4 MHz narrowband (NB), and respective transmissions on M-PDCCH and PDSCH within the RA window according to one exemplary implementation of this disclosure.

As regards the example (1) above, where the UE monitors the CSS for M-PDCCH for DCI the CRC of which is scrambled with RA-RNTI sent during the RAR window, FIG. 3 shows an example of an RAR window assuming cross-subframe scheduling and dynamically indicated or pre-defined NB location for the PDSCH transmission carrying the RAR message. In general, K, X, Z≥0. Here, multiple copies of the M-PDCCH as well as associated transmissions on the PDSCH are shown assuming for exemplary purposes that the device may be in EC or in need to receive multiple copies of the same message. It should be noted that although the subframes corresponding to the CSS for M-PDCCH monitoring are shown to be time division multiplexed with the PDSCH transmissions carrying the RAR message, in another example, subframes for monitoring of the CSS could potentially span all subframes within the RAR window.

Note that it would be also possible that the last M-PDCCH repetition is in the last subframe of the RAR window, while the PDSCH carrying the RAR message is transmitted on a subsequent subframe. In this latter example the extent of the RAR window defines the subframes for the CSS for M-PDCCH scheduling RAR. The "subsequent subframe" might be understood as (a) a subframe after the associated CSS for M-PDCCH scheduling RAR was sent, but still within the RAR window, or (b) a subframe after the RAR windows. In all of these cases the frequency or NB regions used might be same or different.

Figure 4:
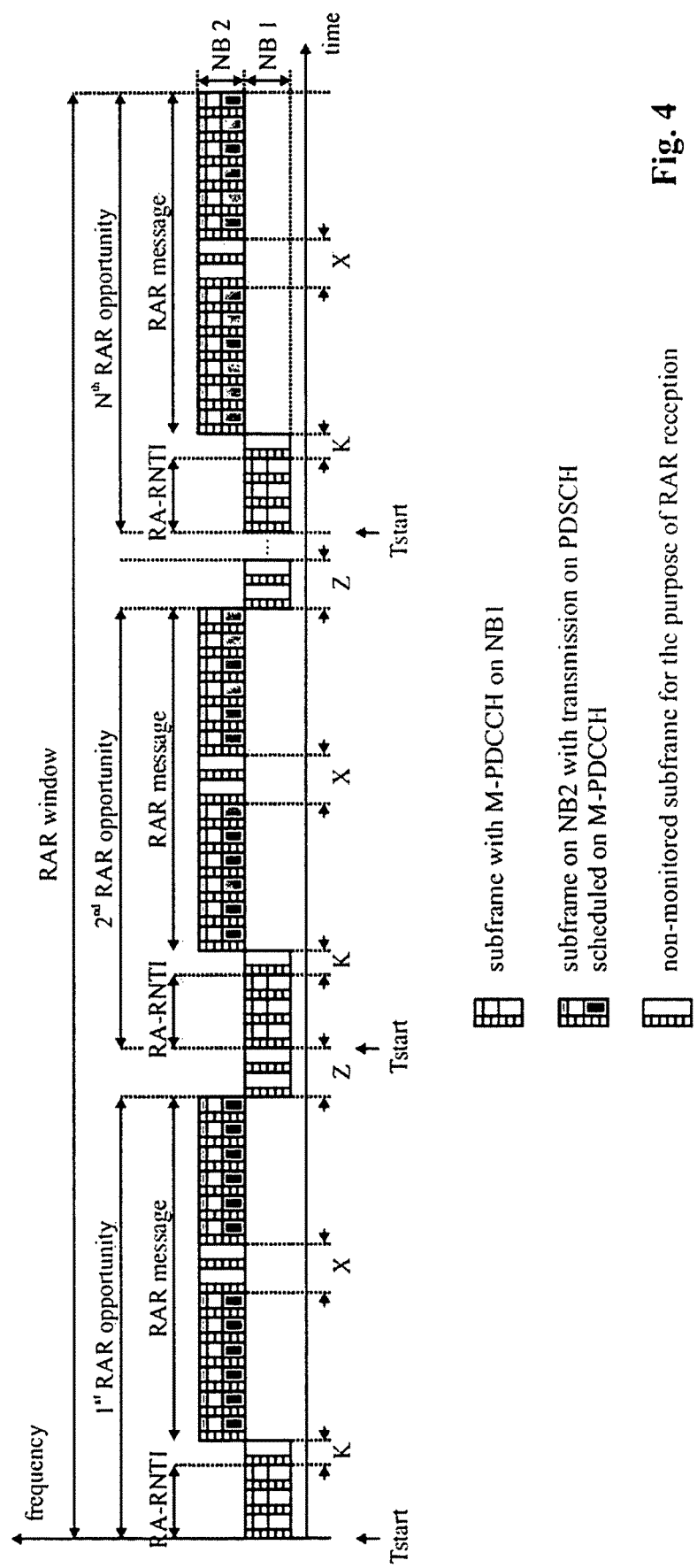
FIG. 4 shows an exemplary sequence of subframes in a RAR window within two 1.4 MHz narrowbands (NB) according to one exemplary implementation of this disclosure, where transmissions on M-PDCCH and PDSCH within the RA window are performed in distinct narrowbands (cross-NB scheduling).

Furthermore, also cross-NB scheduling could be implemented. For example, the M-PDCCH may be sent on one narrowband (NB1) and may schedule the transmission of the RAR on another NB (NB2) as exemplarily shown in FIG. 4. Both NBs may define NBs within the overall system bandwidth and must not necessarily be adjacent to each other in the frequency domain. In case of cross-NB scheduling, a UE supporting reduced bandwidth will have to tune its RF circuitry for reception of the M-PDCCH in the first narrowband NB1 and will thereafter tune its RF circuitry to carrier frequency of the narrowband NB2 on which the transmission of the RAR is scheduled.

For the HARQ-ACK feedback from the UE in response to the Message 4 or RRC Connection Setup messages, the physical resources for PUCCH transmissions may be derived using the evolved Control Channel Element (E-CCE) indices and/or PRB locations (e.g. starting PRB indices) for the associated M-PDCCH or PDSCH transmissions carrying the DL assignment for the Message 4 or RRC Connection Setup message.

Indication of Multicast Information Transmission

Further, the CSS (for example CSS-ConnectedMisc) is used to convey multicast of information, and some examples or details on how this might be enabled are described below. Using the CCS for multicast may be applicable for UEs in connected (RRC CONNECTED mode) and/or idle mode (RRC IDLE mode). Different multicast groups may be defined, e.g. by reusing some of the Closed Subscriber Group (CSG) aspects. Alternatively, new multicast grouping and functionality can defined to better fulfill the IoT/MTC requirements. An example use case of this solution is when software updates need to be distributed to a large group of UEs, if not all UEs, in a cell. This may be for example useful for the deploying software updates for UEs for Internet of Things (IoT)—or Machine-to-Machine (M2M)—or MTC-mode operation.

The use of a CSS for conveying a multicast transmission may be for example be realized according to one of the following example. The possible implementations are of course not limited by these examples:

(1) In one example, the multicast indication is provided to the UEs through a broadcast message, such as, system information (SI) message or a paging message. Assuming the paging example, the paging message could be used to indicate when a multicast transmission is to be sent by the eNB.

The indication of an upcoming multicast transmission may be for example realized by including a corresponding indication within the DCI carried by the M-PDCCH in the CSS. Alternatively, the indication could be also included in associated paging information carried on the PDSCH. Furthermore, the how and when the multicast message will be sent after the UE receives the multicast indication could be either predefined or pre-configured by the network.

The timing of the multicast message may be for example defined relative to the subframe comprising the paging indication (e.g. after a known number subframes following the paging indication). Alternatively, the multicast message may also be transmitted in next broadcast control channel (BCCH) modification period.

As regards format of the multicast transmission, the transport format (coding and modulation scheme) could be specified.

(2) In another example, the multicast transmission is sent by means of a broadcast message, such as, a SI message or paging message. Assuming the paging case, the main difference with example (I) is that the actual multicast transmission would be started or scheduled using M-PDCCH at the actual paging occasion (PO/PF). In the case of using SI for transmitting the multicast message, an existing SI message might extended or a new SI message can be defined for conveying the multicast transmission.

(3) In a further example, the multicast indication or message might be defined as broadcast, unicast or multicast kind of message and might be based on legacy LTE ones, GERAN ones or a new one that may be defined. For example, the UEs could be indicated through the M-PDCCH in a CSS, e.g. a CSS-ConnectedMisc when this multicast message is sent.

Options for Time-Frequency Resource Configuration for CSS

In the most general case, in case there are different instances of CSSs, the different instances can map to different time and/or frequency resources. In the time domain, the individual CSS could be mapped to different subframes or radio frames. For example a CSS-RAR may be monitored during the duration of the RAR window and a CSS-Message4 is monitored during the duration of the Contention-ResolutionTimer.

In the frequency domain, the different instances of CSS could be either mapped to different NBs. This may still involve that multiple instances of CSSs are mapped to the same NB, but it is also possible that a respective CSS is mapped to a respective NB.

For example, the CSS-RAR and CSS-Paging may be mapped to a subset of PRBs within the same NB. This may address situations wherein a Paging Occasion (PO) or the time-resources for M-PDCCH with respect to the PO fall within the RAR window for a UE such that UE may need to monitor M-PDCCH for potential RAR as well as paging transmissions. In this case, if CSS-RAR and CSS-Paging are mapped to different NBs, the UE may need to prioritize between RAR and paging for the subframes with time-domain conflict in case the UE only supports reception on a single NB at a given time instance.

If CSS-RAR and CSS-Paging are mapped to different NBs, in one example, the RAR reception may be prioritized, since UE has already transmitted the PRACH and may in fact need to initiate a RA procedure otherwise based on the paging message (e.g., paging message triggered by arrival of Mobile Terminated traffic). Alternatively, the paging message reception could be prioritized with the understanding that prompt reception of the paging message may be necessary, e.g., if the paging message relates to Public Warning System (PWS) messages.

For the case wherein a single CSS is defined for RAR and paging, such time-domain overlap for monitoring for different messages, e.g., RAR and paging messages, can be addressed by multiple blind decoding attempts by the UE for the corresponding DCIs (using different RNTIs). If the DCIs are of the same size, then only multiple checks for different RNTIs used for scrambling would be needed.

Note 1: The transmission type for M-PDCCH in the CSS can be fixed to be either of the distributed or localized type and hence, no further configuration via signaling may be needed to indicate the M-PDCCH transmission type.

The terminology of "CSS-XXX" or "CSS-XXX-MPDCCH" or "nUE-SS-XXX-MPDCCH" or "CSS-XXX for M-PDCCH", amongst others, might be used to refer to these new designed of non-UE specific SS for M-PDCCH that is explained with respect to various implementations that provides actual message XXX or scheduling information of the message XXX. It is further understood that XXX may be for example a RAR, paging or Message 4. However its scope is also not limited to these messages, and may be used for other purposes (e.g., group TPC, group HARQ-ACK feedback, etc.).

Furthermore, the exemplary implementations of aspects of this disclosure discussed in the following subsections are described using the idea of defining separate CSS for RAR, paging, etc., many of these implementations can be equally applicable to the option wherein a single CSS is defined for a UE with the differentiation of the different use cases identified, e.g., via the RNTI used to scramble the CRC or via different time instances when the CSS is monitored by a UE.

RAR Message Scheduling

If a single RAR message is to be transmitted in a 1.4 MHz narrowband (NB), then it is to be transmitted directly using the M-PDCCH, else, it is to be transmitted using PDSCH that is scheduled by M-PDCCH. However given that a UE would not expect unicast scheduling until after RRC connection is established, a new exemplary implementation is described here by which the UE can monitor a CSS-RAR for M-PDCCH transmissions either carrying the RAR message itself or carrying scheduling information for the RAR message transmitted using PDSCH.

Configuration of Common Search Space for RAR (CSS-RAR)

One or multiple instances of CSS-RAR can be configured by the network based on different factors, such as the EC mode or the EC level. The UE may monitor one of them (e.g. CSS-RAR EC level x) depending on its EC mode or EC level. Furthermore, transmission details of the PRACH preamble may also—or alternatively—be taken into account for choosing the instance of the CSS-RAR to be monitored by the UE. The different instances of the CSS-RAD may be for example multiplexed via Frequency Division Multiplexing (FDM) on different narrowbands (NBs).

Alternatively the UE may monitor more than one CSS-RAR (e.g. CSS-RAR EC level x and (e.g. CSS-RAR EC level y) assuming for example that UE has enough UE capabilities, the UE is not sure about its EC level and/or the each instance of the CSS-RARs is sent in TDM manner.

In time dimension, the UE may be configured to monitor this CSS during certain time, defined as the extent of the RAR window, which can be defined similar to legacy specifications. In comparison to the LTE legacy implementation the maximum duration of the RAR window may be increased in the time domain to accommodate repeated transmissions of the M-PDCCH to address higher repetition levels (RLs) for Random Access in the MTC context. The duration of the RAR window can be indicated by the eNB in terms of the start and end subframes or start subframe and duration of the RAR window in terms of a number of DL subframes. This information on the RAR location and duration in the time domain may be for example signaled using a MTC SIB, via dedicated signaling, or one or more RAR window configurations, values or set of configurations may be (pre-)defined.

In this exemplary implementation, the RAR window is interpreted by the UE as the duration during which a UE may expect the M-PDCCH transmission carrying the RAR message or M-PDCCH transmission carrying the DL scheduling assignment for the PDSCH carrying the RAR message, while the PDSCH itself may be transmitted after the end of the RAR window. Note that cross-subframe scheduling and repetitions needed for enhanced coverage operation may be used for the DL transmission of the RAR (Message 2) on PDSCH.

In frequency dimension, it is possible that different UEs are configured to monitor CSS-RAR on different narrowbands (NBs). The association between the PRACH preamble in the UL to the NB used for RAR transmission in the DL may be defined as a function of at least one of: the frequency resource (f_id) used for transmission of the PRACH preamble, the PRACH sequence used by the UE, the coverage enhancement (CE) level (sometimes also referred to as enhanced coverage (EC) level herein) used by the UE for PRACH transmission (i.e., the time/frequency/sequence resources used for PRACH transmission for a particular CE level). Note that, different instances of CSS-RAR for different CE levels can be FDM multiplexed at the system-level so that a UE in a better coverage condition does not have to waste power in accumulating a much larger number of repetitions for M-PDCCH. Alternatively, the multiple instances of CSS-RAR could also be configured within a reduced BW or NB if each instance of the CSS-RAR can be differentiated based on its functionality, e.g. EC level.

The configuration of the one or more instances of the CSS-RAR can be provided in the MTC SIB. The configuration information can include one or more of the following configuration information: a starting subframe for M-PDCCH repetitions, a number of repetitions for M-PDCCH (Repetition Level for the M-PDCCH in the CSS-RAR), Aggregation Levels (ALs) used for M-PDCCH, the NB index, the PRBs within the NB that constitute the M-PDCCH-PRB set (e.g., number of PRBs can be 2, 4, or 6).

The starting subframe for M-PDCCH transmission in the CSS-RAR can either be indicated with respect to System Frame Number (SFN). An offset to the SFN could be for example implicitly indicated by aligning the starting subframe (DF) for M-PDCCH in the CSS-RAR with the beginning of the RAR window. Hence, the UE would try to decode M-PDCCH starting at the beginning of the RAR window (SF #n) by combining a number of repeated transmissions (R=RL value indicated as part of the CSS-RAR configuration) for each possible M-PDCCH candidate. In other word, the UE would combine SFs #n through #n+R where R is the number of repetitions (RL value). If it does not successfully decode an M-PDCCH, it starts combining M-PDCCH candidates from SF #n+R+1 through SF #n+2R, etc. until the end of the RAR window.

Alternatively, similarly to the SFN concept above, the indication of the starting subframe of the CSS-RAR could be relative to the extended SFN or Hyper SFN that is being considered within Release13 extended DRX framework (instead of the SFN). In another alternative implementation, the starting subframe of the CSS-RAR could be also indicated to relative to a clock time (e.g. UTC based).

Since the UE would be able to determine the RL for the M-PDCCH from the RL for PRACH transmission, the UE could determine, using the RL of the PRACH preamble, which instance of the CSS-RARs (i.e. which narrowband) the UE has to monitor. This can be determined by the UE by using a mapping from the PRACH RL to the RL for M-PDCCH indicated in the configuration for CSS-RAR for each configured narrowband. The exact mapping could either be configured or specified. Alternatively, the RL for the M-PDCCH can be limited to multiple (e.g. two) possible values corresponding to the PRACH repetition level (PRACH RL) and the UE would try decoding an M-PDCCH corresponding to the different hypothesis for each possible RL for M-PDCCH. This can provide some flexibility at the network side at the expense of increased blind decoding attempts at the UE side.

The choice of ALs for a CSS-RAR may be limited to a subset of possible ALs depending on the CE level targeted for the particular instance of CSS-RAR. In another alternative implementation, the AL used for M-PDCCH in EC in the CSS-RAR can be specified to always use the maximum AL. For example, an AL of 24 (AL=24) could be assumed for EC. Using the maximum AL may allow minimizing the number of repetitions needed for transmitting the M-PDCCH and can reduce blind decoding attempts of the UE. Both advantageous would be beneficial for reducing UE power consumption for monitoring for M-PDCCH transmissions in the CSS-RAR. In the latter case (and also independent thereof), the PRBs for the M-PDCCH-PRB set could be fixed to include all the PRBs in a NB for CSS-RAR that corresponds EC. For a 1.4 MHz NB, this would imply that all 6 PRBs are used for M-PDCCH.

DCI Formats and Blind Decoding in the CSS-RAR

Figure 5:
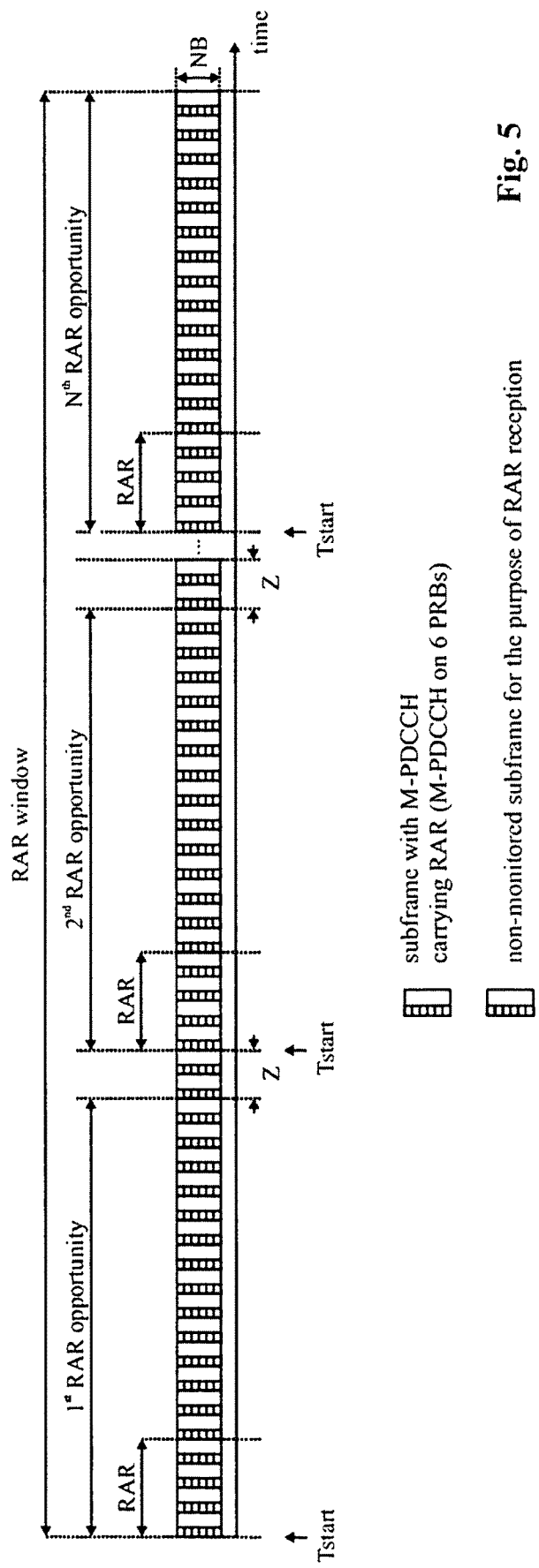
FIG. 5 shows another exemplary sequence of subframes in a RAR window within a 1.4 MHz narrowband (NB) according to one exemplary implementation of this disclosure, wherein respective transmissions on M-PDCCH within the RA window comprise the RAR.

In one example implementation, the RAR message may be transmitted on PDSCH and is scheduled via M-PDCCH, as described for example in connection with FIG. 3 above. Furthermore, in an alternative implementation, the RAR message may also be transmitted within the DCI on the M-PDCCH. This exemplar is illustrated in FIG. 5, which shows another exemplary sequence of subframes in a RAR window within a 1.4 MHz narrowband (NB) according to one exemplary implementation of this disclosure, wherein respective transmissions on M-PDCCH within the RA window comprise the RAR.

Of course, it is also possible that both of the options are combined in one implementation. In this case the UE monitors the M-PDCCH in the CSS-RAR for either for a Downlink Control Information (DCI) that includes the contents of the RAR message itself (referred to as DCI-RAR in this disclosure), or a DCI with the DL scheduling assignment that schedules the RAR message transmission on PDSCH (referred to as DCI-SA-RAR in this disclosure). In case the RAR is contained in a DCI, the RAR message payload may be reduced in size, in comparison to a RAR message scheduled on PDSCH. The payload may be reduced, e.g., by removing some of the fields in the legacy RAR message, such as for example one or more of some fields in the UL grant of the RAR, like TPC, UL delay, and/or Aperiodic CSI request field.

This exemplary implementation may result in increased UE complexity due to increase in the number of blind decoding attempts for multiple DCI formats. Assuming that the size of DCI-RAR would be larger than DCI-SA-RAR, one option to reduce the number of blind decoding attempts may be to use zero-padding for the DCI-SA-RAR to match its size to that for DCI-RAR. However, this would result in reduced efficiency due to increase in the DL control overhead from the transmission of a larger-than-necessary DCI-SA-RAR.

As noted above, the UE may know the repetition level (RL) of RAR transmissions from the repetition level of its most recent PRACH preamble sent on the UL. Here, RL of transmission of RAR implies the RL of the transmissions of the M-PDCCH. Further, the UE may determine based on Reference Signal Received Power (RSRP) measurement whether or not to start using one of the PRACH resource sets for CE (i.e. PRACH transmission with repetitions). Therefore, based on the decision of whether to use CE for sending the PRACH preamble during random access, and the choice of RL for the PRACH preamble, the UE could to determine the number of repetitions of M-PDCCH transmissions for the RAR message, that could be transmitted either within a DCI or scheduled by DCI on the PDSCH.

In case of supporting the general case wherein UE monitors a M-PDCCH in the CSS-RAR for both DCI formats (i.e. for DCI-RAR and DCI-SA-RAR), two mapping relationships between number of repetitions for PRACH preamble and number of repetitions for M-PDCCH may be defined: one for DCI-RAR and another one for DCI-SA-RAR. Depending on the exact size of each DCI format, a fixed relationship between the repetitions for DCI-RAR and DCI-SA-RAR can be (pre-)defined or indicated via MTC SIB signaling. For example, a factor x=(number of repetitions for DCI-RAR)/(number of repetitions for DCI-SA-RAR) can be defined in the specifications or included in the MTC SIB. Further, the factor x can also be a function of the coverage enhancement (CE) level of the UE to address the non-linearity in the number of required repetitions vs. operating Signal-to-Noise Ratio (SNR) which is related to the CE level.

In another exemplary implementation, where zero-padding is used for matching the size of the DCI for DCI-SA-RAR and DCI-RAR, only one mapping relationship between number of repetitions for PRACH preamble and number of repetitions for M-PDCCH may be defined.

To minimize UE complexity, in an alternative implementation, the UE determines the DCI format to monitor for on M-PDCCH in the CSS-RAR in response to a (based on) the PRACH preamble. In this connection, it is to be noted that the size of the RAR payload increases with an increase in the number of UEs addressed (i.e. number of RAR records). This can lead to a large number of repetitions for the M-PDCCH as well as the associated PDSCH transmissions, especially when in EC, when multiple RAR messages are transmitted in a single RAR MAC PDU. Thus, it may be more practical to address a single UE in a RAR MAC PDU for UEs in EC at a time. Accordingly, in one example, the eNB may only address multiple UEs in a single RAR MAC PDU when the target UEs are in normal coverage, and may only transmit a single RAR record using M-PDCCH (i.e. transmit DCI-RAR) for RAR messages intended for UEs in EC.

It should be noted that repetitions of M-PDCCH and PDSCH transmissions (DCI for scheduling on PDSCH and the RAR message respectively) may be needed for UEs in normal coverage as well. Therefore, in another exemplary implementation the UE may assume that the RAR is transmitted within the DCI (DCI-RAR) on the M-PDCCH when the UE is in EC for transmitting PRACH preamble (i.e. when the UE uses repetitions for PRACH preamble transmission). Otherwise, the UE may assume that the RAR is transmitted using the PDSCH that is scheduled by DCI on M-PDCCH (DCI-SA-RAR). Consequently, the UE monitors the M-PDCCH in the physical resources defined by the CSS-RAR configuration during the RAR window for DCI-RAR if repetitions were used for PRACH transmissions, and monitors the CSS-RAR during the RAR window for DCI-SA-RAR if the PRACH was transmitted without repetitions.

All of the different exemplary implementations of transmitting the RAR message during random access described are also applicable for paging, the transmission of Message 4 (within the Contention Resolution window) as well as other messages that might fulfill the same kind of requirements as previously explain. For further clarification, some of those points that might be different or important to highlight for paging message in particular has been added below; however if an aspect described in RAR section is not described in paging section below this should not be understood as restricted.

Paging Message Scheduling

A UE may be paged by the network when in IDLE or CONNECTED modes. For IDLE mode paging, similar to the case of RAR reception, a UE would not have to monitor the M-PDCCH for transmissions in the related CSS related to unicast scheduling during or preceding the different paging occasions (POs). In one example, the M-PDCCH transmission carrying the DCI (scheduling assignment) is transmitted during the paging occasion (PO) and the scheduled paging message is transmitted on PDSCH within a subsequent subframe. Alternatively, paging message could be transmitted on the PDSCH during the PO, but the MTC UE is specified to wake up k subframe(s) before the PO to receive the M-PDCCH with the DCI (scheduling assignment) for the scheduled paging message transmission of PDSCH during the PO.

Here the parameter k refers to the time-gap between the starting subframe of the M-PDCCH repetition and the starting subframe of the associated PDSCH in units of subframes. Thus, k includes the number of M-PDCCH repetitions and the time-gap between the last repetition of the M-PDCCH and the first repetition of the associated paging message transmission of the PDSCH.

In summary, similar to the case for RAR, a UE would not need to monitor the a CSS for paging for all valid subframes for M-PDCCH transmission but only during certain subframes that either correspond to start of the Paging Frames (PFs) or POs, or subframes transmitted a certain time-gap prior to the PO. The time-gap could be for example specified (predetermined) or indicated (e.g. configured by signaling from eNB).

Configuration of Common Search Space for Paging (CSS-Paging)

Similar concepts as for RAR can be applied for defining the CSS for paging (CSS-paging). Specifically, one or multiple instances of CSS-paging can be configured by the network. Multiple CSS can be configured such that different UEs can monitor different physical resources, e.g., different NBs for M-PDCCH carrying scheduling assignment for paging message transmission. This may allow minimizing the user blocking probability for paging transmissions. The NB in which the M-PDCCH is to be monitor in the physical resources of the given CSS-paging may be for example defined as a function of the UE ID, e.g. the s-TMSI or IMSI.

Optionally, it is possible to map different CSS for paging to different EC levels. For example, if the UE may determine its EC level (e.g. based on DL measurements or based on (pre-)configuration), and the UE may monitor the M-PDCCH within the CSS-paging corresponding to the determined EC level. This optional feature may allow optimizing the RL for the M-PDCCH transmissions depending on the target EC level, thereby avoiding unnecessarily large number of repetitions to be accumulated by UEs that may be experiencing better radio channel conditions.

Accordingly, the eNB would transmit the scheduling M-PDCCH for paging targeting a particular UE in the CSS-paging of the M-DPCCH corresponding to its UE ID and/the UE's EC level.

Using the EC level for the definition of the relevant CSS for paging assumes that the information on the UE's EC level is available from the Mobility Management Entity (MME) or in the eNB. For example, the MME or eNB could learn the EC level of the UE from a previous operation of the UE in RRC CONNECTED mode within the cell. However, one potential challenge for EC level-based differentiation of paging-related CSSs may be that the EC level information available at the MME or eNB for a UE may be outdated at the relevant point in time, which could lead to transmissions on the M-PDCCH within a CSS-paging not monitored by the UE.

Therefore, in one further example implementation, instead of considering the EC level of the UEs, the UEs may be categorized in two groups. One group would contain UEs experiencing in poor radio conditions and another group experiencing better radio conditions. The information on grouping the UEs may be considered available to the respective UEs and network by default or through (pre-)configuration.

The multiple instances of CSS for paging may be mapped to physical resources in same or different NBs. In case multiple CSS are defined within a single NB, the M-PDCCH-PRB sets for each CSS may have less than 6 PRBs. Alternatively, a maximum of one CSS for paging may be mapped to a respective one of plural NBs.

For paging of UEs in RRC CONNECTED mode, in one example, the UE can monitor the same CSS for paging as in RRC IDLE mode. Note that in case all UEs within a radio cell of the eNB are to be paged and multiple instances of CSS-paging are defined, for RRC CONNECTED mode paging, the eNB may transmit DCI scheduling the paging message in each of the CSS-paging instances. Simultaneously paging all UEs within a cell is for example useful for System Information Update (SIU)-related or for Public Warning System (PWS)-related paging.

In an alternative example to using the same CSS for paging in RRC CONNECTED mode and RRC IDLE mode, POs for RRC CONNECTED mode paging may be different from the POs for RRC IDLE mode paging (e.g. triggered by Mobile Terminated traffic). The POs for the RRC CONNECTED mode paging could be for example defined for System Information Update and PWS-related paging. Further, it is also possible to define a single CSS for paging for all RRC CONNECTED mode UEs in the cell. The scheduling information on the M-PDCCH within such single CSS for paging and the scheduled transmission no PDSCH for these paging messages can be transmitted with the maximum RL configured based on the maximum target EC level supported by the cell.

Another option—similar to what has been described in connection with the transmission of RAR above—may be to transmit the PWS- and SIU-related paging information within the DCI on the M-PDCCH and within the physical resources of the CSS for paging.

As for the case of RAR, the configuration of a CSS-paging for M-PDCCH can be provided in the MTC SIB. The configuration information may include one or more of the following configuration information: a starting subframe for M-PDCCH repetitions, number of repetitions for M-PDCCH (RL for the M-PDCCH in the CSS-paging), ALs used for M-PDCCH, the NB index, the PRBs within the NB that constitute the M-PDCCH-PRB set (e.g., number of PRBs can be 2, 4, or 6).

As mentioned above in connection with the transmission of the RAR, the starting subframe for M-PDCCH repetitions can be derived with respect to the starting subframe defining the PO and the RL used for the M-PDCCH. The AL used for M-PDCCH for paging can be fixed to the maximum AL, such as for example AL=24. Furthermore, the M-PDCCH-PRB set for the CSS-paging may be fixed to 6 PRBs of a NB. This can help minimize the number of repetitions needed for transmitting the M-PDCCH for scheduling paging messages and thereby help reduce UE power consumption incurred due to monitoring for paging messages.

Additional Exemplary Implementations

FIG. 1 shows operations of a Random Access (RA) procedure between a UE and a eNB using a CSS for RA-related messages according to one exemplary implementation of this disclosure. The eNB transmits 1001 (e.g. via broadcast) System Information (SI) within its radio cell. The SI may comprise System Information Blocks (SIBs). One of the SIBs may comprise information for MTC related services. This MTC SIB, in this example, comprises a CSS configuration of RA-related messages. The configuration information may for example indicate the starting subframe of the CSS and one or more narrowbands (NBs) to be monitored by the UE. Further, the configuration information may also define the RLs and/or ALs to be monitored by the UE. Further, the configuration information may also define the M-PDCCH PRB set sizes. In accordance with the above, a (single) CSS is defined for RAR (Message 2), HARQ feedback for Message 3 (Connection Request) and Message 4 (Contention Resolution) of the RA-procedure (CSS-RA). A UE within the eNBs radio cell receives 1002 the SI including the MTC SIB and detects the configuration information for the CSS for RA-related messages (CSS-RA) therein.

For example triggered by some UL data to be sent by the UE or due to paging, the UE starts 1003 an RA procedure at some later point in time. The UE selects one of the available RACH preambles and transmits the Random Access Channel (RACH) preamble (Message 1) to the eNB on the RACH in the UL. If the UE is in CE, the UE may send multiple repetitions of the PRACH preamble as noted above. The eNB receives 1004 the RACH preamble and responds to the UE by sending a RAR (Message 2) message. The RAR is transmitted 1005 by the eNB on the M-PDCCH that will be monitored by the UE based on the CSS-RA transmitted within the MTC SIB (see steps 1001 and 1002). As noted previously, the RAR message is sent by the eNB within a RAR window, as for example indicated in FIGS. 3 and 4 and described herein above. Hence, the eNB may either schedule the transmission of the RAR on M-PDCCH within the CSS-RA and transmit the RAR in some other, later subframe(s), or may include the RAR message directly in the M-PDCCH transmission(s) (e.g. within the DCI). The eNB may optionally repeat these transmissions in case the PRACH preamble has been received from a UE in CE as outlined previously herein.

Within the RAR window, the UE monitors 1006 the CCS-RA defined within the respective subframe(s) of the RAR window for M-PDCCH transmissions that either schedule or contain the RAR, and will receive the RAR message from the eNB. Note that in case multiple candidate NBs on which the RAR could be sent are configured, the UE may determine the NB to be monitored, e.g. based on the CE level or the RL the UE has used for transmission of the PRACH preamble in step 1003. The RAR message may for example contain a temporary Cell Radio Network Temporary Identifier (C-RNTI), which is a temporary identity assigned from the eNB to the UE for the further communication in the RA procedure. Furthermore, the RAR message may also contain a timing advance value, which informs UE to change its transmission timing on UL so as to compensate for the round trip delay. Furthermore, the RAR also includes a UL grant to the UE for transmission of the next message, Connection Request (Message 3) on the UL Shared Channel (UL-SCH).

In response to receipt of the RAR (Message 2), the UE transmits 1007 a Connection Request (Message 3) on the allocated UL resources. The transmission includes a CRC which is scrambled by the UE with the assigned C-RNTI. The Connection Request message also includes a RRC Connection Request message, as well as an identifier of the UE, e.g. a Temporary Mobile Subscriber Identity (TMSI) or a random value (RV), because the C-RNTI in the RAR may also have been received by another UE due to collision. The Connection Request message may also comprise an indication of the connection establishment cause indicating the reason why UE needs to connect to network (e.g. due to paging).

The eNB receives 1008 the Connection Request message on the received UL resources the eNB replies to the UE by sending 1009 a Contention Resolution message (Message 4). Note that the eNB may also provide Hybrid Automatic Repeat Request (HARQ) feedback indicating a successful (ACK) or non-successful (NACK) decoding of Message 3 to the UE. The ACK can be implicitly indicated by transmission of the DL assignment for Message 4 while a NACK indication in response to Message 3 could include the UL grant for the retransmission of Message 3. The transmission of the HARQ ACK/NACK is omitted for simplicity in FIG. 1. However, the UE will also monitor the CSS-RA on the defined DL subframes for the HARQ ACK/NACK message (we assume for simplicity that the Message 3 is successfully received by the eNB).

The Contention Resolution message that is sent by eNB has a CRC that is scrambled by the UE identifier comprised in the Connection Request message (Message 3), which allows the UE(s) receiving the message to identify a collision during RA. Message 4 contains a new C-RNTI which will be used by the UE for the further communication. The Contention Resolution message may also comprise a RRC Connection Setup message, which—optionally—may comprise configuration information for one or more instances of CSS on the M-PDCCH. Furthermore, the Contention Resolution message may comprise another UL grant for transmission of the next messages of the RRC connection establishment procedure.

Message 4 is sent at a given timing (Message 4 window or Contention Resolution window) in the DL. Accordingly, the UE will monitor 1010 the physical resources within the subframes on DL corresponding to the configured CSS-RA to detect a M-PDCCH transmission that either schedule or contain the Contention Resolution message, and will receive the Contention Resolution message from the eNB. As noted previously, it is again possible that the Contention Resolution message is either scheduled on M-PDCCH and transmitted on the allocated resourced on PDSCH, or the Contention Resolution message may also be comprised within the DCI on the M-PDCCH.

The UE will decode 1011 the Contention Resolution message and will descramble the CRC with the UE identifier comprised in the Connection Request message (Message 3) to confirm that the UE identifier comprised in the Connection Request message (Message 3) is destined to the UE. The UE extracts the UL grant and C-RNTI from the Connection Request message. Furthermore, the UE uses the configuration information for the one or more instances of CSS comprises in the RRC Connection Setup message to configure 1012 the respective CSS configuration(s).

Furthermore, the UE may then finalize 1013 the RRC connection establishment by replying to the RRC Connection Setup message on the granted UL resources using the new C-RNTI, and will thereafter communicate with the network in CONNECTED mode.

Figure 2:
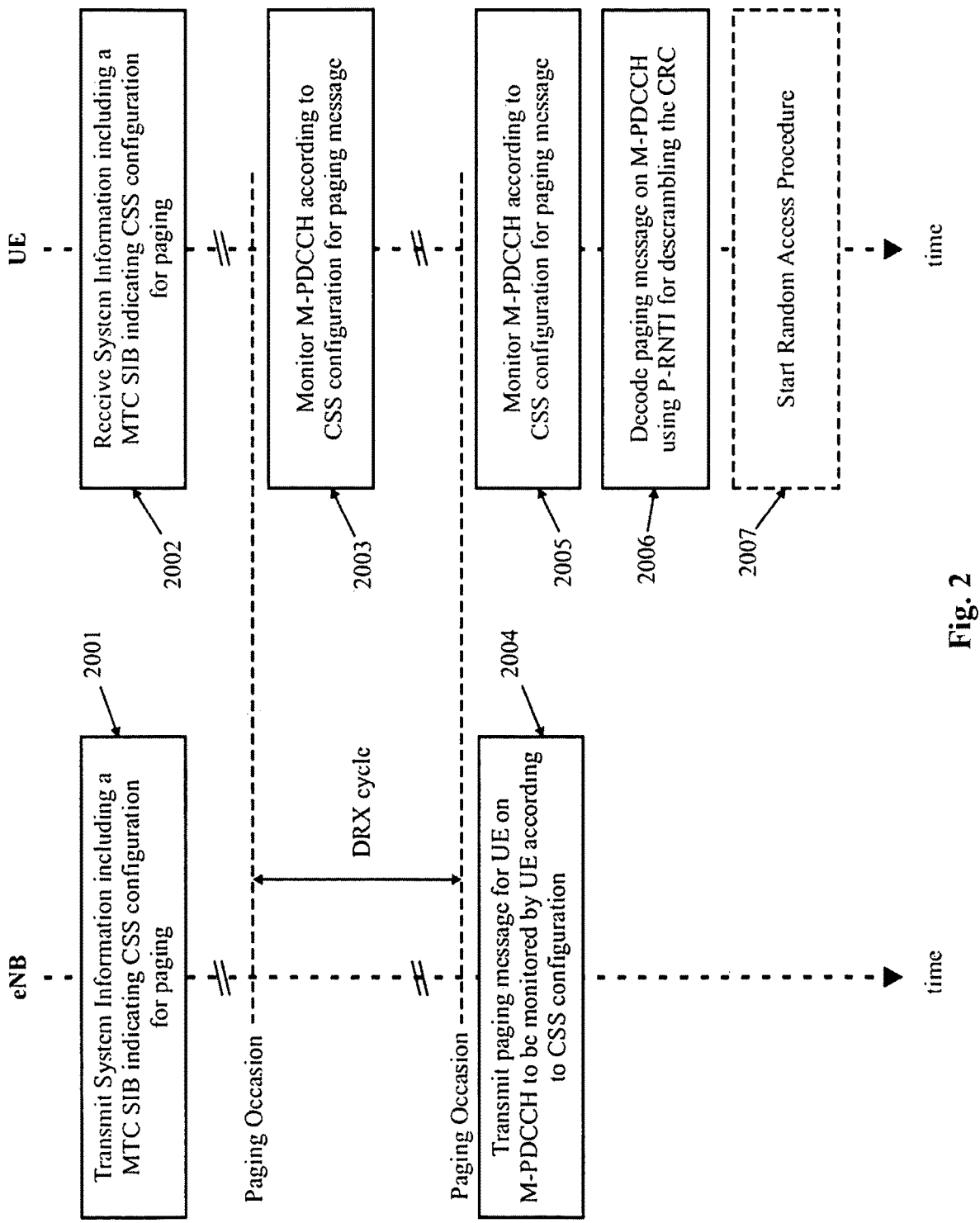
FIG. 2 shows operations of a paging procedure between a UE and an eNB using a CSS for paging-related messages according to one exemplary implementation of this disclosure.

FIG. 2 shows operations of a paging procedure between a UE and an eNB using a CSS for paging-related messages according to one exemplary implementation of this disclosure. The eNB transmits 2001 (e.g. via broadcast) System Information (SI) within its radio cell. The SI may comprise System Information Blocks (SIBs). One of the SIBs may comprise information for MTC related services. This MTC SIB, in this example, comprises a CSS configuration of paging-related messages (CSS-paging). Note that SIU- or PWS-related messages may optionally be considered paging-related in this example, i.e. M-PDCCH transmissions for these functionalities may be also sent on the CSS-paging defined in the MTC-SIB.

The configuration information may for example indicate one or more narrowbands (NBs) to be monitored by the UE. Further optionally, the configuration information may also define the maximum RL to be monitored by the UE. Further optionally, the configuration information may also define the M-PDCCH PRB set sizes. Note that it may be assumed for exemplary purposes that for paging, the eNB uses the maximum AL (e.g. AL=24) for M-PDCCH transmissions and the M-PDCCH PRB set size is equivalent of 6 PRBs and the M-PDCCH in the CSS-Paging is always of distributed type.

The UE receives 2002 the SI including the MTC SIB with the configuration information for the CSS to be used for paging (CSS-paging). At the given POs, the UE monitors 2003 the M-PDCCH within the CSS-paging for paging messages destined to the UE. Note that in case there are different candidates of NBs to be monitored, the UE may for example select the NB for monitoring based on a UE identifier (UE-ID). In step 2003 it is assumed that no paging-related message is indicated on the M-PDCCH within the configured CSS.

At a later PO, the eNB may need to page the UE. The eNB thus transmits 2004 a paging message for the UE on the M-PDCCH in the DL. The a paging message for the UE is transmitted on the M-PDCCH in the DL within on physical resources of one or more subframes (depending on the RL value of the CSS configuration) that are part of the configured CSS-paging and are thus expected to be monitored by the UE. The M-PDCCH transmission of the eNB may include a CRC that is scrambled by the eNB with the P-RNTI of the UE.

As in step 2003, the UE again monitors 2005 the M-PDCCH at this later PO, and detects the M-PDCCH transmission of the eNB by being able to confirm proper decoding 2006 of the M-PDCCH transmission based on the CRC descrambled with the UE's P-RNTI. As mentioned previously herein, the eNB may either transmit the paging message within the DCI on the M-PDCCH directly, or the M-PDCCH transmission may include scheduling information indicating to the UE the DL resources on which the UE is to receive the paging message. Once the UE has received and decoded the paging message, the UE may for example start 2007 a RA procedure, as for example outlined above in connection with FIG. 1.

The aspects and implementation examples thereof as discussed in this disclosure are useful (but not limited) for use with UEs supporting "reduced bandwidth". For the purpose of this disclosure a UE having or supporting a "reduced bandwidth" refers to a UE that receives (and optionally transmit) with a limited bandwidth. Limited bandwidth generally may for example mean a smaller bandwidth than defined on the system level of the mobile communication system. The limited bandwidth may for example correspond to a narrowband (NB). For example, in the 3GPP LTE context, limited bandwidth may for example mean a bandwidth of 1.4 MHz, but this disclosure is not limited to this bandwidth. The limited bandwidth could for example also mean a bandwidth of 180 kHz. In an alternative definition, a UE supporting "reduced bandwidth" may be defined as a UE that can receive (and optionally transmit) only a limited number of frequency-continuous physical resource blocks (PRBs)—that may correspond to a NB—in the frequency domain at a given time.

It should be noted that a UE supporting "reduced bandwidth" may be able switch reception (and optional transmission) between different frequency resources (e.g. different NBs) at different time instances. For example, the UE may receive PRBs of a first NB during one or more subframes, and may then receive PRBs on another second NB during one or more later subframes.

Furthermore, although the aspects and implementation examples thereof as discussed in this disclosure herein above have been focused on the definition of one or more instances of a CSS on the E-PDCCH for MTC (M-PDCCH), it should be noted that the principles may also be applicable for the definition of one or more instances of a CSS on the E-PDCCH for M2M or IoT services, i.e. services in which the use of UEs with reduced bandwidth may be relevant in terms of costs and complexity. The E-PDCCH for MTC, M2M and/or IoT services may also be referred to as a NB-PDCCH, for example.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

Figure 6:
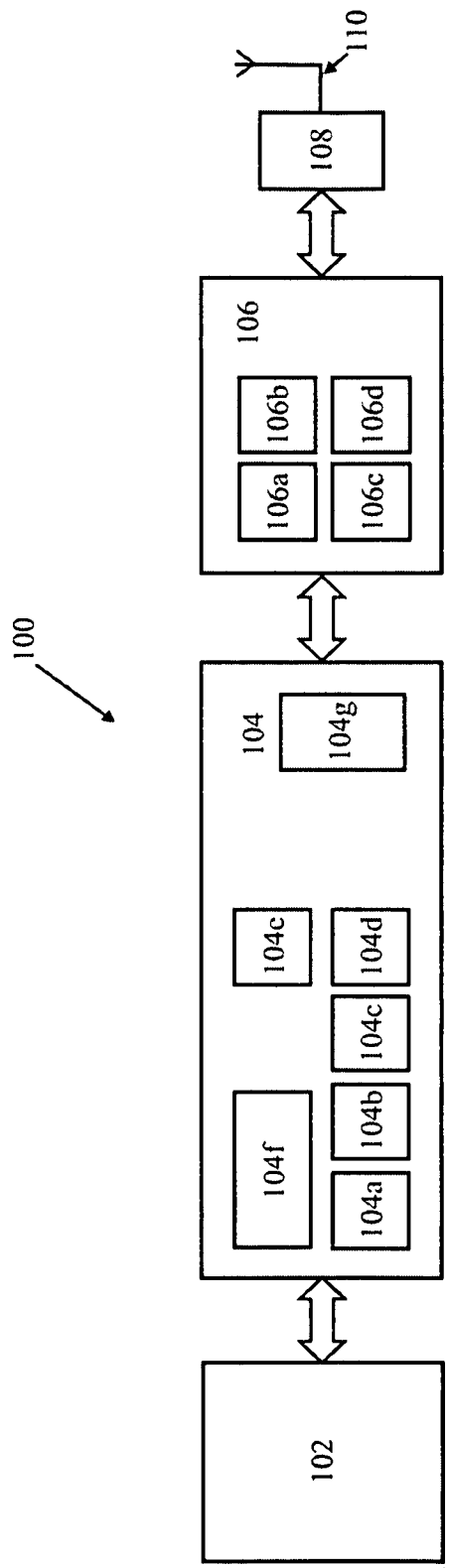
FIG. 6 illustrates example components of an electronic device in which the different aspects of this disclosure can be implemented.

The different implementations of this disclosure described herein may be implemented into a system using any suitably configured hardware and/or software. FIG. 6 illustrates, for one implementation, example components of an electronic device 100. In implementations, the electronic device 100 may be, implement, be incorporated into, or otherwise be a part of a user equipment (UE), an evolved NodeB (eNB), or some other electronic device. In some implementations, the electronic device 100 may include application circuitry 102, baseband circuitry 104, Radio Frequency (RF) circuitry 106, front-end module (FEM) circuitry 108 and one or more antennas 110, coupled together at least as shown. Note that in case the electronic device 100 implements a UE for MTC, M2M or IoT services, the baseband circuitry 104 and RF circuitry 106 may support a reduced bandwidth only, e.g. they may receive (and optionally transmit) only a limited number of frequency-continuous physical resource blocks (PRBs)—that may correspond to a NB—in the frequency domain at a given time. The limited number of frequency-continuous physical resource blocks (PRBs) may be for example correspond to a narrowband (NB) defined in a mobile communication system.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some implementations, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some implementations, modulation/demodulation circuitry of the baseband circuitry 104 may include Fast-Fourier Transform (FFT), precoding, and/or constellation mapping/demapping functionality. In some implementations, encoding/decoding circuitry of the baseband circuitry 104 may include convolution, tail-biting convolution, turbo, Viterbi, and/or Low Density Parity Check (LDPC) encoder/decoder functionality. Implementations of modulation/demodulation and encoder/decoder functionality are not limited to these examples and may include other suitable functionality in other implementations.

In some implementation's, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some implementations, the baseband circuitry may include one or more audio digital signal processor(s) (DSP) 104f. The audio DSP(s) 104f may be include elements for compression/decompression and echo cancellation and may include other suitable processing elements in other implementations.

The baseband circuitry 104 may further include memory/storage 104g. The memory/storage 104g may be used to load and store data and/or instructions for operations performed by the processors of the baseband circuitry 104. Memory/storage for one implementation may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some implementations. In some implementations, some or all of the constituent components of the baseband circuitry 104 and the application circuitry 102 may be implemented together such as, for example, on a system on a chip (SOC).

In some implementations, the baseband circuitry 104 may provide for communication compatible with one or more radio technologies. For example, in some implementations, the baseband circuitry 104 may support communication with an evolved universal terrestrial radio access network (EUTRAN) and/or other wireless metropolitan area networks (WMAN), a wireless local area network (WLAN), a wireless personal area network (WPAN). Implementations in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various implementations, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some implementations, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some implementations, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some implementations, the output baseband signals may be zero-frequency baseband signals, although this is not a requirement. In some implementations, mixer circuitry 106a of the receive signal path may comprise passive mixers, although the scope of the implementations is not limited in this respect.

In some implementations, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the implementations is not limited in this respect.

In some implementations, the mixer circuitry 106a of the receive signal path and the mixer circuitry 106a of the transmit signal path may include two or more mixers and may be arranged for quadrature downconversion and/or upconversion respectively. In some implementations, the mixer circuitry 106a of the receive signal path and the mixer circuitry 106a of the transmit signal path may include two or more mixers and may be arranged for image rejection (e.g., Hartley image rejection). In some implementations, the mixer circuitry 106a of the receive signal path and the mixer circuitry 106a may be arranged for direct downconversion and/or direct upconversion, respectively. In some implementations, the mixer circuitry 106a of the receive signal path and the mixer circuitry 106a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode implementations, a separate radio IC circuitry may be provided for processing signals for each spectrum, although the scope of the implementations is not limited in this respect.

In some implementations, the synthesizer circuitry 106d may be a fractional-N synthesizer or a fractional N/N+1 synthesizer, although the scope of the implementations is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some implementations, the synthesizer circuitry 106d may be a fractional N/N+1 synthesizer.

In some implementations, frequency input may be provided by a voltage controlled oscillator (VCO), although that is not a requirement. Divider control input may be provided by either the baseband circuitry 104 or the applications processor 102 depending on the desired output frequency. In some implementations, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 106d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some implementations, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some implementations, the electronic device 100 may include additional elements such as, for example, memory/storage, display, camera, sensor, and/or input/output (I/O) interface.

In some implementations, the electronic device 100 may be configured to perform one or more methods, techniques, and/or processes as described herein.

EXAMPLES

Example 1 may include a user equipment (UE) with reduced bandwidth (BW) support of 1.4 MHz at both Radio Frequency (RF) and baseband equipped with:

a RF circuitry to communicate with an evolved Node-B (eNB) and receive a configuration of one or a plurality of non-UE-specific Search Space (CSS) for M-PDCCH (Physical Downlink Control CHannel for MTC);

and a baseband circuitry coupled with the RF circuitry, the baseband circuitry to that is to monitor for M-PDCCH transmissions according to configured CSS.

Example 2 may include the UE of example 1 or some other example herein, wherein it is not required to monitor the CSS for M-PDCCH in every DL subframe.

Example 3 may include the UE of example 1 or some other example herein, wherein the CSS for M-PDCCH is common to all the UEs in the cell but only certain groups of UEs may monitor a certain instance of the CSS for M-PDCCH.

Example 4 may include the UE of example 3 or some other example herein, wherein the CSS is monitored by all or a group of UEs in the cell "based on functionality" differentiations that may include the type of use case (message to be transmitted or scheduled), enhanced coverage (EC) level of the UE, etc.

Example 5 may include the UE of example 3 or some other example herein, wherein different instances of CSS are mapped to different time or frequency resources.

Example 6 may include the UE of example 5 or some other example herein, wherein the different instances of CSS are mapped to different subframes or radio frames in time.

Example 7 may include the UE of example 5 or some other example herein, wherein, in frequency dimension, the different instances of CSS are mapped to different narrowbands (NBs) or the same NB.

Example 8 may include the UE of example 1 or some other example herein, wherein each instance of the CSS is based on the type of message being transmitted or scheduled as CSS for RAR (CSS-RAR), CSS for paging (CSS-Paging), nUE-SS for Message 4 (CSS-Message 4) scheduling, and CSS-ConnectedMisc for other Layer 1 control information transmission in RRC CONNECTED mode.

Example 9 may include the UE of example 8 or some other example herein, wherein it monitors a particular instance of "CSS-RAR" for M-PDCCH transmissions either carrying the RAR message itself (DCI-RAR) or carrying scheduling information (DCI-SA-RAR) for the RAR message transmitted using PDSCH, and wherein one or multiple instances of CSS-RAR are configured by the network at the system-level based on different factors that includes the different EC levels of UEs.

Example 10 may include the UE of example 9 or some other example herein, wherein the configuration of a CSS-RAR is provided in the MTC SIB.

Example 11 may include the UE of example 10 or some other example herein, wherein the configuration information includes at least one or some, if not all, of the following: starting subframe for M-PDCCH repetitions, number of repetitions for M-PDCCH (Repetition Level for the M-PDCCH in the CSS-RAR), Aggregation Levels (ALs) used for M-PDCCH, the NB index, the PRBs within the NB that constitute the M-PDCCH-PRB set wherein number of PRBs is one of {2, 4, 6}.

Example 12 may include the UE of example 8 or some other example herein, wherein the zero-padding is used to match the sizes of the DCI-SA-RAR and DCI-RAR.

Example 13 may include the UE of example 8 or some other example herein, wherein the UE can determine which DCI format to monitor for in the CSS-RAR in response to a PRACH preamble transmission.

Example 14 may include the UE of example 13 or some other example herein, wherein multiple UEs are addressed in a single RAR MAC PDU when the target UEs are in normal coverage and a single RAR record is transmitted using M-PDCCH (i.e., transmit DCI-RAR) for RAR messages intended for UEs in enhanced coverage, and wherein the UE assumes that the RAR is transmitted using DCI-RAR directly using the M-PDCCH when it is in enhanced coverage w.r.t. PRACH transmissions, i.e., when it uses repetitions for PRACH transmission and otherwise, the UE assumes that the RAR is transmitted using the PDSCH that is scheduled by DCI-SA-RAR.

Example 15 may include the UE of example 1 or some other example herein, wherein one or multiple instances of CSS-Paging are configured by the network.

Example 16 may include the UE of example 15 or some other example herein, wherein multiple search spaces are configured such that different UEs monitor different physical resources, e.g., different NBs for M-PDCCH carrying scheduling assignment for paging message transmission.

Example 17 may include the UE of example 16 or some other example herein, wherein the NB to monitor CSS-Paging is defined as a function of the UE ID, e.g., the s-TMSI or IMSI.

Example 18 may include the UE of example 16 or some other example herein, wherein the NB to monitor CSS-Paging is defined as a function of the EC level of the UE.

Example 19 may include the UE of example 15 or some other example herein, wherein the UE monitors the same instance of CSS-Paging in both RRC CONNECTED and RRC IDLE modes.

Example 20 may include the UE of example 19 or some other example herein, wherein, if multiple CSS-Paging are defined, then for CONNECTED mode paging, the DCI scheduling the paging message is transmitted in each of the CSS-Paging.

Example 21 may include the UE of example 15 or some other example herein, wherein Paging Occasions (POs) separate from the POs for Idle mode paging (e.g., triggered by Mobile Terminated traffic) are defined for System Information Update and Public Warning System (PWS)-related paging and a single CSS-Paging is defined for all UEs in the cell to monitor for scheduling of these paging messages.

Example 22 may include the UE of example 21 or some other example herein, wherein the scheduling M-PDCCH and the associated PDSCH for these paging messages are transmitted with the maximum Repetition Level (RL) configured based on the maximum target EC level supported by the cell.

Example 23 may include the UE of example 15 or some other example herein, wherein the configuration of a CSS-Paging for M-PDCCH is provided in the MTC SIB.

Example 24 may include the UE of example 23 or some other example herein, wherein the configuration information includes at least one or some, if not all, of the following: starting subframe for M-PDCCH repetitions, number of repetitions for M-PDCCH (Repetition Level for the M-PDCCH in the CSS-Paging), Aggregation Levels (ALs) used for M-PDCCH, the NB index, the PRBs within the NB that constitute the M-PDCCH-PRB set wherein number of PRBs is one of {2, 4, 6}.

Example 25 may include the UE of example 24 or some other example herein, wherein the starting subframe for M-PDCCH repetitions is derived w.r.t. the starting subframe defining the PO and the RL used for the M-PDCCH.

Example 26 may include the UE of example 24 or some other example herein, wherein the AL used for M-PDCCH for paging is fixed to the maximum AL=24 and the M-PDCCH-PRB set for the CSS-Paging fixed to 6 PRBs of a NB.

Example 27 may include the UE of example 1 or some other example herein, wherein a single CSS configuration is provided for the UE to monitor and the UE monitors the CSS for different DCIs scrambling by different RNTIs at different time instances.

Example 28 may include the UE of example 27 or some other example herein, wherein a common configuration of CSS for M-PDCCH, except the narrowband (NB) index, is provided and different sets of UEs are implicitly indicated to monitor different physical resources (e.g., narrowbands) for monitoring of M-PDCCH transmissions in their respective CSS for M-PDCCH.

Example 29 may include the UE of example 28 or some other example herein, wherein the monitored NB depends on the one or more of: UE Identity (UE ID), EC level, and PRACH transmission parameters and resources.

Example 30 may include the UE of example 27 or some other example herein, wherein the configuration for the CSS is provided as a single configuration along with the indices of the NBs.

Example 31 may include the UE of example 27 or some other example herein, wherein for the use of CSS for purposes other than transmission of RAR, paging or Message 4, the same CSS is monitored with different configuration information, such as, starting subframe for M-PDCCH, and periodicity.

Example 32 may include the UE of example 31 or some other example herein, wherein the additional configuration information is indicated by configuring a period, duration and offset (w.r.t. System Frame Number) that are provided to the UE via dedicated RRC signaling or via LC/EC/MTC/CIoT SIB signaling or multicast signaling.

Example 33 may include the UE of example 32 or some other example herein, wherein for the case of dedicated RRC signaling, the configuration is signaled as part of the configuration of UE-specific search space, such as through Message 4, RRC Connection Reconfiguration message in new or existing fields or information elements.

Example 34 may include the UE of example 1 or some other example herein, wherein some of the CSS are separately configured depending on functionality, and some are combined into a single CSS configuration that the UE monitors at different times and with different RNTI for different purposes.

Example 35 may include the UE of example 34 or some other example herein, wherein a common CSS configuration is signaled to monitor for M-PDCCH transmissions: for scheduling of RAR messages, for carrying the HARQ-ACK feedback in response to Message 3 transmissions on the UL, for Message 4 scheduling, and for the scheduling of the PDSCH with the RRC Connection setup message if the RRC Connection setup message is not carried along with the Message 4 transmission.

Example 36 may include the UE of example 35 or some other example herein, wherein the time resources (subframes) for monitoring for the M-PDCCH candidates in the common CSS and the frequency location for the common CSS may be determined similar to the options described for CSS-RAR.

Example 37 may include the UE of example 34 or some other example herein, wherein a common CSS configuration is signaled to monitor for M-PDCCH transmissions: for carrying the HARQ-ACK feedback in response to Message 3 transmissions on the UL, for Message 4 scheduling, and for the scheduling of the PDSCH with the RRC Connection setup message if the RRC Connection setup message is not carried along with the Message 4 transmission.

Example 38 may include the UE of example 34 or some other example herein, wherein the set of repetition levels (RLs) and aggregation levels (ALs) to monitor for this CSS are common set for all these purposes or pre-defined rules are specified to define the relationship between the possible set of (AL, RL) pair to be monitored for detection of each of the M-PDCCH transmissions for the different purposes.

Example 39 may include the UE of example 1 or some other example herein, wherein for the HARQ-ACK feedback from the UE in response to the Message 4 or RRC Connection Setup messages, the physical resources for PUCCH transmissions are derived using the ECCE indices and/or PRB locations (e.g., starting PRB indices) for the associated M-PDCCH or PDSCH transmissions carrying the DL assignment for the message transmission or the message (Message 4 or RRC Connection Setup) itself.

Example 40 may include the UE of example 1 or some other example herein, wherein a common CSS or a specific configuration of CSS that may be the same as the CSS-Paging is used is used to convey indication of transmission of multicast information in the DL.

Example 41 may include the UE of example 40 or some other example herein, wherein the indication of the transmission of multicast information is transmitted to UEs in only RRC_CONNECTED mode or UEs in RRC_IDLE mode or both.

Example 42 may include the UE of example 40 or some other example herein, wherein the indication of the multicast transmission is through a broadcast message like paging or system information message.

Example 43 may include the UE of example 42 or some other example herein, wherein for the case of paging to provide multicast indication, the multicast indication is either transmitted directly in the DCI carried by the M-PDCCH or in the PDSCH carrying the paging message scheduled by M-PDCCH.

Example 44 may include the UE of example 42 or some other example herein, wherein the multicast transmission starts or is scheduled using M-PDCCH at the Paging Occasion and or the Paging Frame itself.

Example 45 may include the UE of example 40 or some other example herein, wherein the multicast indication is through a multicast message that may be newly defined and scheduled using M-PDCCH in an appropriate CSS.

Example 46 may include an apparatus comprising means to perform one or more elements of a method described in or related to any of examples 1-45, or any other method or process described herein.

Example 47 may include one or more non-transitory computer-readable media comprising instructions to cause an electronic device, upon execution of the instructions by one or more processors of the electronic device, to perform one or more elements of a method described in or related to any of examples 1-45, or any other method or process described herein.

Example 48 may include an apparatus comprising logic, modules, and/or circuitry to perform one or more elements of a method described in or related to any of examples 1-45, or any other method or process described herein.

Example 49 may include a method, technique, or process as described in or related to any of examples 1-45, or portions or parts thereof.

Example 50 may include a method of communicating in a wireless network as shown and described herein.

Example 51 may include a system for providing wireless communication as shown and described herein.

Example 52 may include a device for providing wireless communication as shown and described herein.

Example 53 for execution by a user equipment (UE) with reduced bandwidth (BW) support at both Radio Frequency (RF) and baseband, the method comprising: receiving from an evolved Node-B (eNB) configuration information of one or more Common Search Spaces (CSSs) for M-PDCCH (Physical Downlink Control CHannel for MTC); and monitoring for M-PDCCH transmissions according to the one or more configured CSSs.

Example 54 is an optional enhancement of Example 53, wherein the UE is not required to monitor the CSS for M-PDCCH in every Downlink (DL) subframe.

Example 55 is an optional enhancement of Example 53 or 54, wherein there is a plurality of CSSs for M-PDCCH wherein the CSSs are common to all the UEs in the cell, but only certain groups of UEs monitor a respective instance of the CSSs for M-PDCCH.

Example 56 is an optional enhancement of Example 55, wherein the plurality of CSSs is monitored by all or said groups of UEs in the cell "based on functionality"-differentiations that includes the type of use case and/or an enhanced coverage (EC) level of the UE.

Example 57 is an optional enhancement of Example 55 or 56, wherein different instances of the plurality of CSSs are mapped to different time or frequency resources.

Example 58 is an optional enhancement of Example 57, wherein the different instances of the plurality of CSSs are mapped to different subframes or radio frames in time.

Example 59 is an optional enhancement of Example 57 or 58, wherein, in frequency dimension, the different instances of the plurality of CSSs are mapped to different narrowbands (NBs) or the same NB.

Example 60 is an optional enhancement of one of Examples 53 to 59, wherein each instance of the plurality of CSS is corresponds to a type of message being transmitted or scheduled thereon.

Example 61 is an optional enhancement of one of Examples 53 to 60, wherein the one or more CSSs include one or more of the following:
one or more CSSs for Random Access Response (RAR) message (CSS-RAR),
one or more CSSs for paging messages (CSS-Paging),
one or more CSSs for scheduling Message 4 (CSS-Message 4), and
one or more CSSs for transmitting other Layer 1 control information to UEs in RRC CONNECTED mode (CSS-ConnectedMisc).

Example 62 is an optional enhancement of one of Examples 53 to 61, further comprising monitoring one instance of the one or more CSS-RARs for a RAR message (DCI-RAR) or scheduling information (DCI-SA-RAR) for a RAR message transmitted using PDSCH, and wherein one or multiple instances of CSS-RARs are configured by the network at the system-level based on the different EC levels of UEs.

Example 63 is an optional enhancement of Example 61 or 62, wherein providing configuration information of the one or more CSS-RARs to the UE in the MTC SIB.

Example 64 is an optional enhancement of Example 63, wherein the configuration information for a respective instance of the one or more CSS-RARs includes one or more of the following:
starting subframe for M-PDCCH repetitions,
Repetition Level (RL) for M-PDCCH,
Aggregation Levels (ALs) used for M-PDCCH,
an NB index, and
PRBs within the NB that constitute the M-PDCCH-PRB set, wherein number of PRBs is one of $\{2, 4, 6\}$.

Example 65 is an optional enhancement of one of Examples 62, wherein the zero-padding is used to match the sizes of the DCI-SA-RAR and DCI-RAR.

Example 66 is an optional enhancement of one of Examples 62 to 65, further comprising determining at the UE which DCI format to monitor for in the CSS-RAR in response to transmitting a PRACH preamble.

Example 67 is an optional enhancement of Example 66, further comprising: addressing multiple UEs in a single RAR MAC PDU, if the target UEs are in normal coverage; and transmitting a single RAR record using M-PDCCH for RAR messages intended for UEs in enhanced coverage, and wherein the UE assumes that the RAR is transmitted using DCI-RAR directly using the M-PDCCH when the UE uses repetitions for PRACH transmission and wherein the UE assumes that the RAR is transmitted using the PDSCH that is scheduled by DCI-SA-RAR otherwise.

Example 68 is an optional enhancement of one of Examples 53 to 67, wherein one or more instances of a CSS-Paging are configured by the network.

Example 69 is an optional enhancement of Example 68, wherein plural instances of the CSS-Paging are configured, and different UEs monitor different physical resources for respective instances of the CSS-Paging.

Example 70 is an optional enhancement of Example 68 or 69, wherein plural instances of the CSS-Paging are, and different UEs monitor different NBs for M-PDCCH carrying scheduling assignment for paging message transmission.

Example 71 is an optional enhancement of Example 70, wherein the respective one of the NBs to monitor by the UE for CSS-Paging is defined by a function of the UE ID.

Example 72 is an optional enhancement of Example 70 or 71, wherein the respective one of the NBs to monitor by the UE for CSS-Paging is defined by a function of the EC level of the UE.

Example 73 is an optional enhancement of one of Examples 68 to 72, wherein the UE monitors the same instance of CSS-Paging in both RRC CONNECTED and RRC IDLE modes.

Example 74 is an optional enhancement of Example 73, wherein plural instances of the CSS-Paging are defined, and for CONNECTED mode paging, Dedicated Control Information (DCI) scheduling the paging message is transmitted in each of the instances of the CSS-Paging.

Example 75 is an optional enhancement of one of Examples 68 to 74, wherein Paging Occasions (POs) separate from the POs for Idle mode paging are defined for System Information Update (SIU)-related and Public Warning System (PWS)-related paging, and a single common CSS-Paging is defined for all UEs in the cell to monitor for scheduling of or SIU-related and PWS-related paging messages.

Example 76 is an optional enhancement of Example 75, wherein the scheduling information of the paging messages on the M-PDCCH and the paging messages on a Physical Downlink Shared Channel (PDSCH) are transmitted with the maximum Repetition Level (RL) configured based on the maximum target enhanced coverage (EC) level supported by the cell.

Example 77 is an optional enhancement of one of Examples 68 to 76, further comprising providing configuration information of a CSS-Paging for M-PDCCH in a MTC SIB.

Example 78 is an optional enhancement of Example 77, wherein the configuration information includes one or more of the following:
 a starting subframe for M-PDCCH repetitions,
 Repetition Level (RL) for M-PDCCH,
 Aggregation Levels (ALs) used for M-PDCCH,
 a NB index, and
 PRBs within the NB that constitute the M-PDCCH-PRB set wherein number of PRBs is one of {2, 4, 6}.

Example 79 is an optional enhancement of Example 77 or 78, further comprising deriving, at the UE, a starting subframe for M-PDCCH repetitions with respect to the starting subframe defining the Paging Occasions (PO) and the Repetition Level (RL) used for the M-PDCCH.

Example 80 is an optional enhancement of one of Examples 77 to 79, wherein an Aggregation Level (AL) used for M-PDCCH for paging is fixed to the maximum AL=24 and the M-PDCCH-PRB set for the one or more CSS-Paging fixed to 6 PRBs of a NB.

Example 81 is an optional enhancement of one of Examples 53 to 80, wherein the UE receives a single CSS configuration information for monitoring by the UE, and monitors the CSS for different DCIS scrambling by different RNTIs at different time instances.

Example 82 is an optional enhancement of Example 81, further comprising providing common configuration information of CSS for M-PDCCH, except a narrowband (NB) index and implicitly indicating different sets of UEs to monitor different physical resources for monitoring of M-PDCCH transmissions in their respective CSS for M-PDCCH.

Example 83 is an optional enhancement of Example 81 or 82, wherein the monitored NB depends on one or more of:
 UE Identity (UE ID),
 EC level,
 PRACH transmission parameters, and
 PRACH transmission parameters resources.

Example 84 is an optional enhancement of one of Examples 81 to 83, wherein the configuration information for the one or more CSS is provided as a single configuration along with the indices of the NBs.

Example 85 is an optional enhancement of one of Examples 81 to 84, further comprising, for CSSs for purposes other than transmission of RAR, paging or Message 4, monitoring, by the UE, the same CSS with different configuration information Example 86 is an optional enhancement of Example 85, wherein the different configuration information differ in the narrowband index for the respective CSS, and/or starting subframe for M-PDCCH, and/or a periodicity of the respective CSS.

Example 87 is an optional enhancement of Example 86, wherein the different configuration information configure, for a respective CSS for purposes other than transmission of RAR, paging or Message 4, a period, duration and offset with respect to a System Frame Number (SFN).

Example 88 is an optional enhancement of Example 87, further comprising providing the different configuration information to the UE via dedicated RRC signaling, via LC/EC/MTC/CIoT SIB signaling or via multicast signaling.

Example 89 is an optional enhancement of Example 88, wherein the different configuration information is provided to the UE via dedicated RRC signaling, and the configuration information is signaled as part of the configuration of UE-specific search space.

Example 90 is an optional enhancement of Example 88 or 89, wherein the different configuration information is signaled through Message 4, RRC Connection Reconfiguration message in one or more fields or information elements (IEs).

Example 91 is an optional enhancement of one of Examples 53 to 90, wherein one or more of the CSSs are configured depending on functionality, and other CSSs are combined into a single CSS configuration that the UE monitors at different times and with different RNTI for different purposes.

Example 92 is an optional enhancement of, Example 91, further comprising receiving, at the UE, a common CSS configuration via signaling, monitoring, by the UE, the common CSS for one or more of the following M-PDCCH transmissions:
 HARQ-ACK feedback in response to Message 3 transmissions on Uplink (UL),
 scheduling information of Message 4 messages, and
 scheduling information of a Physical Downlink Shared Channel (PDSCH) with a Radio Resource Control (RRC) Connection setup message, if the RRC Connection setup message is not carried along with the Message 4 transmission.

Example 93 is an optional enhancement of one of Examples 92, wherein the UE further monitors the CSS for scheduling information of RAR messages.

Example 94 is an optional enhancement of one of Examples 91 to 93, wherein a set of repetition levels (RLs) and aggregation levels (ALs) to monitor for the CSS are used for all M-PDCCH transmissions, or pre-defined rules define the relationship between the possible set of (AL, RL) pair to be monitored for detection of each of the M-PDCCH transmissions.

Example 95 is an optional enhancement of one of Examples 53 to 94, wherein for M-PDCCH transmissions comprising HARQ-ACK feedback from the UE in response to the Message 4 message or a RRC Connection Setup message, the physical resources for a transmission on a Physical Uplink Control Channel (PUCCH) are derived using the ECCE indices and/or PRB locations for the associated M-PDCCH or PDSCH transmissions carrying the DL assignment for the message transmission or the Message 4 message or RRC Connection Setup message, respectively.

Example 96 is an optional enhancement of one of Examples 53 to 95, wherein a common CSS or a specific configuration of a CSS is used is used to convey indication of a transmission of multicast information in the Downlink (DL).

Example 97 is an optional enhancement of Example 96, where the CSS is a CSS for paging messages (CSS-Paging).

Example 98 is an optional enhancement of Example 96 or 97, wherein the indication of the transmission of multicast information is transmitted to UEs in only RRC_CONNECTED mode or UEs in RRC_IDLE mode or both.

Example 99 is an optional enhancement of one of Examples 96 to 98, wherein the indication of the transmission of multicast information is transmitted as a broadcast message.

Example 100 is an optional enhancement of Example 99, where the broadcast message is a paging message or system information message.

Example 101 is an optional enhancement of Example 100, wherein the broadcast message is a paging message, and wherein the multicast indication is transmitted either directly in the DCI carried by the M-PDCCH or in the PDSCH carrying the paging message scheduled by M-PDCCH.

Example 102 is an optional enhancement of Example 99 to 101, wherein the transmission of the multicast information starts or is scheduled using M-PDCCH at a Paging Occasion (PO) and or a Paging Frame (PF).

Example 103 is an optional enhancement of one of Examples 96 to 102, wherein the multicast indication is through a multicast message that may be newly defined and scheduled using M-PDCCH in an appropriate CSS.

Example 104 is an optional enhancement of one of Examples 43 to 103, wherein the UE supports a reduced bandwidth (BW) of 1.4 MHz or 180 kHz.

Example 105 relates to an electronic device comprising means to perform the method of one of Examples 53 to 104.

Example 106 relates to one or more non-transitory computer-readable media comprising instructions to cause an electronic device, upon execution of the instructions by one or more processors of the electronic device, to perform the method of one of Examples 53 to 104.

Example 107 relates to a user equipment (UE) comprising: RF circuitry to receive, from an evolved Node-B (eNB), configuration information of one or a plurality of common Search Spaces (CSSs) for M-PDCCH (Physical Downlink Control CHannel for MTC); and baseband circuitry to monitor the one or more configured CSS for M-PDCCH transmissions; wherein the RF circuitry and/or baseband circuitry is adapted to support a reduced bandwidth (BW).

Example 108 is an optional enhancement of Example 107, wherein baseband circuit is adapted to monitor the CSS for M-PDCCH in a certain predefined or configured subset of Downlink (DL) subframes.

Example 109 is an optional enhancement of Example 107 or 108, wherein there is a plurality of CSSs for M-PDCCH, and wherein the baseband circuitry is adapted to monitor the plurality of CSSs for M-PDCCH using "based on functionality"-differentiation that includes the type of use case and/or an enhanced coverage (EC) level of the UE.

Example 110 is an optional enhancement of one of Examples 107 to 109, wherein different instances of the plurality of CSSs are mapped to one or more of the following:
different time or frequency resources within a subframe;
different subframes or radio frames in time; and
different narrowbands (NBs) or the same NB.

Example 111 is an optional enhancement of one of Examples 107 to 110, wherein each instance of the plurality of CSS is corresponds to a type of message being transmitted or scheduled thereon.

Example 112 is an optional enhancement of one of Examples 107 to 111, wherein the one or more CSSs include one or more of the following:
one or more CSSs for Random Access Response (RAR) message (CSS-RAR),
one or more CSSs for paging messages (CSS-Paging),
one or more CSSs for scheduling Message 4 (CSS-Message 4), and
one or more CSSs for transmitting other Layer 1 control information to UEs in RRC CONNECTED mode (CSS-ConnectedMisc).

Example 113 is an optional enhancement of Example 112, wherein the baseband circuitry is adapted to monitor one instance of the one or more CSS-RARs for a RAR message (DCI-RAR) or scheduling information (DCI-SA-RAR) for a RAR message transmitted using PDSCH, and wherein one or multiple instances of CSS-RARs are configured by the network at the system-level based on the different Enhanced Coverage (EC) levels of UEs.

Example 114 is an optional enhancement of Example 112 or 113, wherein the RF circuitry is adapted to receive a MTC SIB comprising configuration information of the one or more CSS-RARs to the UE in the MTC SIB; and wherein baseband circuitry is adapted to extract the configuration information from the MTC SIB.

Example 115 is an optional enhancement of Example 114, the configuration information for a respective instance of the one or more CSS-RARs includes one or more of the following:
starting subframe for M-PDCCH repetitions,
Repetition Level (RL) for M-PDCCH,
Aggregation Levels (ALs) used for M-PDCCH,
an NB index, and
PRBs within the NB that constitute the M-PDCCH-PRB set, wherein number of PRBs is one of {2, 4, 6}.

Example 116 is an optional enhancement of one of Examples 107 to 115, wherein one or more instances of CSSs for paging messages (CSS-Paging) are configured by the network.

Example 117 is an optional enhancement of Example 116, wherein the baseband circuitry and/or RF circuitry is/are adapted to monitor different physical resources for respective instances of the CSS-Paging.

Example 118 is an optional enhancement of Example 116 or 117, wherein the baseband circuitry is adapted to identify a narrowband (NB) among plural NBs to which different instances of the CSS-Paging are mapped based on a UE identifier (ID) of the UE, and to monitor the identified NB for the CSS-Paging.

Example 119 is an optional enhancement of one of Examples 116 to 118, wherein the baseband circuitry is adapted to identify a narrowband (NB) among plural NBs to which different instances of the CSS-Paging are mapped based on an Enhanced Coverage (EC) level of the UE, and to monitor the identified NB for the CSS-Paging.

Example 120 is an optional enhancement of one of Examples 116 to 119, wherein the RF circuitry is adapted to receive a MTC SIB comprising configuration information of a CSS-Paging for M-PDCCH, and wherein the baseband circuitry is adapted to extract the configuration information from the MTC SIB.

Example 121 is an optional enhancement of Example 120, wherein the configuration information includes one or more of the following:
a starting subframe for M-PDCCH repetitions,
a Repetition Level (RL) for the M-PDCCH in the CSS-Paging, an Aggregation Levels (ALs) used for M-PDCCH,
a narrowband (NB) index of a NB,
the Physical Resource Blocks (PRBs) within said NB that constitute the M-PDCCH-PRB set, wherein number of PRBs is one of {2, 4, 6}.

Example 122 is an optional enhancement of Example 121, wherein the starting subframe for M-PDCCH repetitions is derived based on a starting subframe defining the Paging Occasion (OC).

Example 123 is an optional enhancement of Example 121 or 122, wherein the AL used for M-PDCCH for paging is fixed to the maximum AL=24, and the M-PDCCH-PRB set for the CSS-Paging fixed to 6 PRBs of a NB.

Example 124 is an optional enhancement of one of Examples 107 to 123, wherein the baseband circuitry is adapted to receive configuration information of a single CSS, and monitors the single CSS for different DCIs scrambling by different RNTIs at different time instances.

Example 125 is an optional enhancement of Example 124, wherein common configuration information of a common SS for M-PDCCH is provided and different sets of UEs are implicitly indicated to monitor different NBs for monitoring of M-PDCCH transmissions in their respective common SS for M-PDCCH, wherein the baseband circuitry selects the NB to be monitored for the common SS for M-PDCCH based on one or more of the following:
  UE Identity (UE ID),
  Enhanced Coverage (EC) level of the UE,
  PRACH transmission parameters, and
  PRACH transmission resources.

Example 126 is an optional enhancement of Example 125, wherein the common configuration information for the CSS is provided as a single configuration along with the indices of the NBs.

Example 127 is an optional enhancement of one of Examples 107 to 126, wherein one or more of the CSS are configured separately depending on functionality, and others of the CSS are combined into a single CSS configuration, wherein the baseband circuitry is adapted to monitor the different CSS configurations at different times and using different RNTIs.

Example 128 is an optional enhancement of Example 127, wherein the baseband circuitry is adapted to receive configuration information of a common CSS, and to monitor the common CSS for one or more of the following M-PDCCH transmissions:
  scheduling information of RAR messages,
  HARQ-ACK feedback in response to Message 3 transmissions on the Uplink (UL),
  scheduling information for Message 4, and
  scheduling information of the PDSCH with the RRC Connection setup message if the RRC Connection setup message is not carried along with the Message 4 transmission.

Example 129 is an optional enhancement of Example 128, wherein the baseband circuitry is further adapted to receive configuration information of a common CSS, and to monitor the common n-UE-SS for scheduling information of RAR messages.

Example 130 is an optional enhancement of Example 128 or 129, wherein a set of Repetition Levels (RLs) and Aggregation Levels (ALs) to monitor for the common CSS is a common set for all said types of M-PDCCH transmissions, or pre-defined rules define the relationship between the possible set of a (AL, RL)-pair to be monitored for detection of each of the M-PDCCH transmissions for the different purposes.

Example 131 is an optional enhancement of one of Examples 107 to 130, wherein a CSS carries HARQ-ACK feedback from the UE in response to the Message 4 or RRC Connection Setup messages, the baseband circuitry is adapted to derive physical resources for PUCCH transmissions using the enhanced control channel element (ECCE) indices and/or PRB locations for the associated M-PDCCH or PDSCH transmissions carrying the DL assignment for the message transmission or the Message 4 or RRC Connection Setup message.

Example 132 is an optional enhancement of one of Examples 107 to 131, wherein the baseband circuitry is adapted to receive an indication of a transmission of multicast information in the Downlink (DL) within a common CSS or a specific configuration of CSS.

Example 133 is an optional enhancement of Example 132, where the CSS having the specific configuration is a CSS-Paging.

Example 134 is an optional enhancement of Example 132 or 133, wherein the UE is in RRC_CONNECTED mode or UEs in RRC_IDLE mode when receiving said indication of the transmission of multicast information.

Example 135 is an optional enhancement of one of Examples 132 to 134, wherein the baseband circuitry is adapted to receive the indication of the transmission of multicast information within a broadcast message.

Example 136 is an optional enhancement of Example 135, where the broadcast message is a paging message or system information (SI) message.

Example 137 is an optional enhancement of Example 135 or 136, where the broadcast message is a paging message and the multicast indication is either transmitted in the DCI carried by the M-PDCCH or in the PDSCH carrying the paging message scheduled by M-PDCCH.

Example 138 is an optional enhancement of one of Examples 132 to 137, wherein the multicast transmission starts or is scheduled using M-PDCCH at a Paging Occasion (PO) and or a Paging Frame (PF).

Example 139 is an optional enhancement of one of Examples 107 to 138, wherein the RF circuitry and/or baseband circuitry is adapted to support a reduced bandwidth (BW) of 1.4 MHz or 180 kHz.

Example 140 relates to an evolved Node B (eNB) comprising: RF circuitry to transmit configuration information of a plurality of common Search Spaces (CSSs) for M-PDCCH (Physical Downlink Control CHannel for MTC) to one or more UEs supporting a reduced bandwidth (BW); wherein the plurality of CSSs for M-PDCCH are differentiated by "based on functionality"-differentiation that includes the type of use case and/or an enhanced coverage (EC) level of the UE.

Example 141 is an optional enhancement of Example 140, wherein the eNB comprises baseband circuitry to map the different instances of the plurality of CSSs to one or more of the following:
  different time or frequency resources within a subframe;
  different subframes or radio frames in time; and
  different narrowbands (NBs) or the same NB.

Example 142 is an optional enhancement of Example 140 or 141, wherein each instance of the plurality of CSS is corresponds to a type of message being transmitted or scheduled thereon.

Example 143 is an optional enhancement of one of Examples 140 to 142, wherein the one or more CSSs include one or more of the following:
  one or more CSSs for Random Access Response (RAR) message (CSS-RAR), one or more CSSs for paging messages (CSS-Paging),
one or more CSSs for scheduling Message 4 (CSS-Message 4), and
one or more CSSs for transmitting other Layer 1 control information to UEs in RRC CONNECTED mode (CSS-ConnectedMisc).

Example 144 is an optional enhancement of Example 143, wherein the baseband circuitry is adapted to include to one instance of the one or more CSS-RARs a RAR message (DCI-RAR) or scheduling information (DCI-SA-RAR) for a RAR message transmitted using PDSCH, and wherein the eNB is adapted to configure one or multiple instances of CSS-RARs at the system-level based on the different Enhanced Coverage (EC) levels of UEs.

Example 145 is an optional enhancement of Example 143 or 144, wherein the baseband circuitry is adapted to cause the RF circuitry to transmit a MTC SIB comprising configuration information of the one or more CSS-RARs.

Example 146 is an optional enhancement of Example 145, wherein the configuration information for a respective instance of the one or more CSS-RARs includes one or more of the following:
starting subframe for M-PDCCH repetitions,
Repetition Level (RL) for M-PDCCH, Aggregation Levels (ALs) used for M-PDCCH,
an NB index, and
PRBs within the NB that constitute the M-PDCCH-PRB set, wherein number of PRBs is one of {2, 4, 6}.

Example 147 is an optional enhancement of one of Examples 140 to 146, wherein the eNB is adapted to configure one or more instances of CSSs for paging messages (CSS-Paging).

Example 148 is an optional enhancement of Example 147, wherein the baseband circuitry is adapted to cause the RF circuitry to transmit respective instances of the CSS-Paging on different physical resources.

Example 149 is an optional enhancement of Example 147 or 148, wherein the baseband circuitry is adapted to cause the RF circuitry to transmit different instances of the CSS-Paging on different narrowbands (NBs),
wherein the baseband circuit is further adapted to map a paging message for a given UE to one of the different instances of the CSS-Paging based on the UE identifier (ID) of the said given UE and/or based on an Enhanced Coverage (EC) level of the given UE.

Example 150 is an optional enhancement of one of Examples 147 to 149, wherein the baseband circuitry is adapted to cause the RF circuitry to transmit a MTC SIB comprising configuration information of a CSS-Paging for M-PDCCH.

Example 151 is an optional enhancement of Example 150, wherein the configuration information includes one or more of the following:
a starting subframe for M-PDCCH repetitions,
a Repetition Level (RL) for the M-PDCCH in the CSS-Paging,
an Aggregation Levels (ALs) used for M-PDCCH,
a narrowband (NB) index of a NB,
the Physical Resource Blocks (PRBs) within said NB that constitute the M-PDCCH-PRB set, wherein number of PRBs is one of {2, 4, 6}.

Example 152 is an optional enhancement of Example 151, wherein the eNB is adapted to derive the starting subframe for M-PDCCH repetitions based on a starting subframe defining the Paging Occasion (OC).

Example 153 is an optional enhancement of Example 151 or 152, wherein the AL used for M-PDCCH for paging is fixed to the maximum AL=24, and the M-PDCCH-PRB set for the CSS-Paging fixed to 6 PRBs of a NB.

Example 154 is an optional enhancement of one of Examples 140 to 153, wherein the baseband circuitry is adapted to cause the RF circuitry to transmit configuration information of a single CSS.

Example 155 is an optional enhancement of Example 154, wherein the baseband circuitry is adapted to cause the RF circuitry to transmit common configuration information of a common SS for M-PDCCH and different sets of UEs are implicitly indicated to monitor different NBs for monitoring of M-PDCCH transmissions in their respective common SS for M-PDCCH, wherein the baseband circuitry is adapted to map messages of different UEs to the common SS on the different NBs based on one or more of the following:
UE Identity (UE ID) of the UE to receive a respective message,
Enhanced Coverage (EC) level of the UE to receive a respective message,
PRACH transmission parameters, and
PRACH transmission resources.

Example 156 is an optional enhancement of Example 154 or 155, wherein the baseband circuitry is adapted to cause the RF circuitry to transmit the common configuration information for the CSS as a single configuration along with the indices of the NBs.

Example 157 is an optional enhancement of one of Examples 140 to 156, wherein the eNB is adapted to configure one or more of the CSS separately depending on functionality, and to combine others of the CSS into a single CSS configuration.

Example 158 is an optional enhancement of Example 157, wherein the baseband circuitry is adapted to cause the RF circuitry to transmit configuration information of a common CSS, and to transmit one or more of the following M-PDCCH transmissions on the common CSS:
scheduling information of RAR messages,
HARQ-ACK feedback in response to Message 3 transmissions on the Uplink (UL),
scheduling information for Message 4, and
scheduling information of the PDSCH with the RRC Connection setup message if the RRC Connection setup message is not carried along with the Message 4 transmission.

Example 159 is an optional enhancement of Example 158, wherein the baseband circuitry is adapted to cause the RF circuitry to transmit configuration information of a common CSS.

Example 160 is an optional enhancement of Example 158 or 159, wherein a set of Repetition Levels (RLs) and Aggregation Levels (ALs) to monitor for the common CSS is a common set for all said types of M-PDCCH transmissions, or pre-defined rules define the relationship between the possible set of a (AL, RL)-pair to be monitored for detection of each of the M-PDCCH transmissions for the different purposes.

Example 161 is an optional enhancement of one of Examples 140 to 160, wherein the baseband circuitry is adapted to cause the RF circuitry to transmit an indication of a transmission of multicast information in the Downlink (DL) within a common CSS or a specific configuration of CSS.

Example 162 is an optional enhancement of Example 161, where the CSS having the specific configuration is a CSS-Paging.

Example 163 is an optional enhancement of Example 161 or 162, wherein the baseband circuitry is adapted to cause the RF circuitry to transmit the indication of the transmission of multicast information within a broadcast message.

Example 164 is an optional enhancement of Example 163, where the broadcast message is a paging message or system information (SI) message.

Example 165 is an optional enhancement of Example 163 or 164, where the broadcast message is a paging message and the multicast indication is either transmitted in the DCI carried by the M-PDCCH or in the PDSCH carrying the paging message scheduled by M-PDCCH.

Example 166 is an optional enhancement of one of Examples 161 to 165, wherein the multicast transmission starts or is scheduled using M-PDCCH at a Paging Occasion (PO) and or a Paging Frame (PF).

Example 167 relates to a method for execution by a user equipment (UE) comprising: receiving, from an evolved Node-B (eNB), configuration information of one or a plurality of common Search Spaces (CSSs) for M-PDCCH (Physical Downlink Control CHannel for MTC); and monitoring the one or more configured CSS for M-PDCCH transmissions; wherein the RF circuitry and/or baseband circuitry is adapted to support a reduced bandwidth (BW).

Example 168 relates to a method for execution by a user equipment (UE) comprising performing the operations and/or processing steps of the UE defined in one of Examples 107 to 139.

Example 169 relates to one or more computer readable media storing instruction that, when executed by one or more processors of a user equipment (UE), cause the UE to: receiving, from an evolved Node-B (eNB), configuration information of one or a plurality of common Search Spaces (CSSs) for M-PDCCH (Physical Downlink Control CHannel for MTC); and monitoring the one or more configured CSS for M-PDCCH transmissions; wherein the RF circuitry and/or baseband circuitry is adapted to support a reduced bandwidth (BW).

Example 170 relates to one or more computer readable media storing instruction that, when executed by one or more processors of a user equipment (UE), cause the UE to perform the operations and/or processing steps of the UE defined in one of Examples 107 to 139.

Example 171 relates to a method for execution by an evolved Node B (eNB), comprising: transmit configuration information of a plurality of common Search Spaces (CSSs) for M-PDCCH (Physical Downlink Control CHannel for MTC) to one or more UEs supporting a reduced bandwidth (BW); wherein the plurality of CSSs for M-PDCCH are differentiated by "based on functionality"-differentiation that includes the type of use case and/or an enhanced coverage (EC) level of the UE.

Example 172 relates to a method for execution by an evolved Node B (eNB), comprising performing the operations and/or processing steps of the eNB defined in one of Examples 140 to 166.

Example 173 relates to one or more computer readable media storing instruction that, when executed by one or more processors of an evolved Node B (eNB), cause the eNB to: transmit configuration information of a plurality of common Search Spaces (CSSs) for M-PDCCH (Physical Downlink Control CHannel for MTC) to one or more UEs supporting a reduced bandwidth (BW); wherein the plurality of CSSs for M-PDCCH are differentiated by "based on functionality"-differentiation that includes the type of use case and/or an enhanced coverage (EC) level of the UE.

Example 174 relates to one or more computer readable media storing instruction that, when executed by one or more processors of an evolved Node B (eNB), cause the eNB to perform the operations and/or processing steps of the eNB defined in one of Examples 140 to 166.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A user equipment (UE) comprising:
Radio-frequency (RF) circuitry to receive, from an evolved Node-B (eNB), configuration information of one or a plurality of common Search Spaces (CSSs) for M-PDCCH (Physical Downlink Control CHannel for MTC), wherein at least one CSS of the one or the plurality of CSSs is common only to a subset of UEs but not all UEs in a cell associated with the eNB, and wherein the configuration information indicates the at least one CSS is configured based on functionality; and
baseband circuitry to monitor the one or more configured CSSs for M-PDCCH transmissions;
wherein the RF circuitry and/or baseband circuitry is adaptable to support a reduced bandwidth (BW).

2. The UE of claim 1, wherein the baseband circuitry is not to monitor the one or more CSSs for M-PDCCH in every Downlink (DL) subframe.

3. The UE of claim 1, wherein the one or more CSSs for M-PDCCH comprises a plurality of CSSs, wherein the plurality of CSSs of M-PDCCH are used by a plurality of UEs within a cell, and wherein a subset of the plurality of UEs within the cell are to monitor instances of the plurality of CSSs for M-PDCCH.

4. The UE of claim 3, wherein the baseband circuitry is to monitor the monitored instances of the plurality of CSSs using based-on-functionality-differentiation that includes a type of use case and/or an enhanced coverage (EC) level of the UE.

5. The UE of claim 1, wherein the baseband circuitry is to monitor different instances of the plurality of CSSs for M-PDCCH on different time or frequency resources.

6. The UE of claim 5, wherein the baseband circuitry is to monitor the different instances of the plurality of CSSs on different subframes or radio frames in time and/or on different narrowbands (NBs) or the same NB.

7. The UE of claim 1, wherein each instance of the plurality of CSS corresponds to a type of message being transmitted or scheduled thereon.

8. The UE of claim 1, wherein the one or more CSSs include one or more of the following:
one or more CSSs for Random Access Response (RAR) message (CSS-RAR),
one or more CSSs for paging messages (CSS-Paging),
one or more CSSs for scheduling Message 4 (CSS-Message 4), or
one or more CSSs for transmitting other Layer 1 control information to UEs in RRC CONNECTED mode (CSS-ConnectedMisc).

9. The UE of claim 8, the baseband circuitry is to monitor one instance of the one or more CSS-RARs for a RAR message (DCI-RAR) or scheduling information (DCI-SA-RAR) for a RAR message transmitted using PDSCH, and
wherein one or multiple instances of CSS-RARs are configured by the network at the system-level based on different EC levels of UEs.

10. The UE of claim 8, wherein the RF circuitry is to receive configuration information of the one or more CSS- RARs and/or one or more CSS-Paging in a Machine-Type-Communication (MTC) System Information Block (SIB).

11. The UE of claim 10, wherein the configuration information for a respective instance of the one or more CSS-RARs and/or one or more CSS-Paging includes one or more of the following:
   starting subframe for M-PDCCH repetitions,
   Repetition Level (RL) for M-PDCCH,
   Aggregation Levels (ALs) used for M-PDCCH,
   an narrowband (NB) index, or
   Physical Resource Blocks (PRBs) within the NB that constitute the M-PDCCH-PRB set, wherein number of PRBs is one of {2, 4, 6}.

12. The UE of claim 10, wherein baseband circuitry is to derive a starting subframe for M-PDCCH repetitions with respect to the starting subframe defining the Paging Occasions (PO) and the Repetition Level (RL) used for the M-PDCCH.

13. The UE of claim 10, wherein an Aggregation Level (AL) used for M-PDCCH for paging is fixed to the maximum AL=24 and the M-PDCCH-PRB set for the one or more CSS-Paging fixed to 6 PRBs of a NB.

14. The UE of claim 8, wherein plural instances of CSS-Paging are configured.

15. The UE of claim 14, wherein different UEs monitor different physical resources for respective instances of the CSS-Paging, or different UEs monitor different NBs for M-PDCCH carrying scheduling assignment for paging message transmission.

16. The UE of claim 14, wherein the baseband circuitry is to determine the respective one of the NBs to monitor for CSS-Paging according to a function of a UE Identifier (ID).

17. The UE of claim 14, wherein the baseband circuitry is to determine the respective one of the NBs to monitor for CSS-Paging according to a function of the EC level of the UE.

18. The UE of claim 1, wherein the RF circuitry is to receive a single CSS configuration information for monitoring by the UE, and the baseband circuitry is to monitor the CSS for different DCIs scrambling by different Radio Network Temporary Identifiers (RNTIs) at different time instances.

19. The UE of claim 18, wherein the RF circuitry is to receive common configuration information of CSS for M-PDCCH implicitly indicating different sets of UEs to monitor different physical resources for monitoring of M-PDCCH transmissions in their respective CSS for M-PDCCH.

20. The UE of claim 18, wherein the baseband circuitry is to determine the monitored NB depending on one or more of the following parameters:
   a UE Identity (UE ID),
   an EC level of the UE,
   Physical Random Access Channel (PRACH) transmission parameters, or
   PRACH transmission parameters resources.

21. The UE of one of claim 11, wherein the configuration information for the one or more CSS is provided as a single configuration along with the indices of the NBs.

22. An evolved Node B (eNB) comprising:
   radiofrequency (RF) circuitry to transmit configuration information of a plurality of common Search Spaces (CSSs) for M-PDCCH (Physical Downlink Control CHannel for MTC) to one or more User Equipments (UEs) supporting a reduced bandwidth (BW), wherein at least one CSS of the plurality of CSSs is common only to a subset of UEs but not all UEs in a cell associated with the eNB, and wherein the configuration information indicates the at least one CSS is configured based on functionality;
   wherein the plurality of CSSs for M-PDCCH are differentiated by based-on-functionality-differentiation that includes a type of use case and/or an enhanced coverage (EC) level of the UEs.

* * * * *